United States Patent
Gokmen et al.

(10) Patent No.: US 10,755,170 B2
(45) Date of Patent: Aug. 25, 2020

(54) RESISTIVE PROCESSING UNIT WITH HYSTERETIC UPDATES FOR NEURAL NETWORK TRAINING

(71) Applicant: INTERNATIONAL BUSINESS MACHINES CORPORATION, Armonk, NY (US)

(72) Inventors: Tayfun Gokmen, Briarcliff Manor, NY (US); Rudolf M. Tromp, North Salem, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 743 days.

(21) Appl. No.: 15/446,264

(22) Filed: Mar. 1, 2017

(65) Prior Publication Data

US 2018/0253642 A1 Sep. 6, 2018

(51) Int. Cl.
*G06N 3/063* (2006.01)
*G06N 3/08* (2006.01)

(52) U.S. Cl.
CPC ........... *G06N 3/0635* (2013.01); *G06N 3/084* (2013.01)

(58) Field of Classification Search
CPC .............................. G06N 3/0635; G06N 3/084
See application file for complete search history.

(56) References Cited

U.S. PATENT DOCUMENTS

| | | |
|---|---|---|
| 7,668,795 B2 | 2/2010 | Okamoto et al. |
| 9,269,043 B2 | 2/2016 | Nugent |
| 2007/0233761 A1 | 10/2007 | Mouttet |
| 2011/0153533 A1 | 6/2011 | Jackson |
| 2015/0066825 A1 | 3/2015 | Harrison et al. |
| 2015/0127594 A1 | 5/2015 | Parada San Martin et al. |
| 2015/0324690 A1 | 11/2015 | Chilimbi et al. |
| 2016/0049195 A1* | 2/2016 | Yu ...................... G11C 13/0026 365/63 |
| 2016/0260436 A1 | 9/2016 | Lemay et al. |
| 2017/0255225 A1* | 9/2017 | Lilja ....................... G06F 7/70 |

FOREIGN PATENT DOCUMENTS

WO 2016068920 A1 5/2016

OTHER PUBLICATIONS

Hyongsuk Kim, "Neural Synaptic Weighting With a Pulse-Based Memristor Circuit" IEEE, pp. 148-158 (Year: 2012).*
Li "Training Itself: Mixed-signal Training Acceleration for Memristor-based Neural Network", IEEE, pp. 361-366 (Year: 2014).*
Lu "Two-Terminal Resistive Switches (Memristors) for Memory and Logic Applications", IEEE, pp. 217-223 (Year: 2011).*

(Continued)

*Primary Examiner* — Ann J Lo
*Assistant Examiner* — Van C Mang
(74) *Attorney, Agent, or Firm* — Cantor Colburn LLP; Vazken Alexanian

(57) ABSTRACT

A technique relates a resistive processing unit (RPU) array. A set of conductive column wires are configured to form cross-points at intersections between the set of conductive row wires and a set of conductive column wires. Two-terminal RPUs are hysteretic such that the two-terminal RPUs each have a conductance state defined by hysteresis, where a two-terminal RPU of the two-terminal RPUs is located at each of the cross-points.

20 Claims, 23 Drawing Sheets

(56) References Cited

OTHER PUBLICATIONS

Kim, "Neural Synaptic Weighting with a Pulse-Based Memristor Circuit", IEEE, pp. 148-158 (Year: 2012).*
Li, "Training itselft: mixed-signal Training Acceleration for Memristor-based Network", IEEE, pp. 361-366 (Year: 2014).*
Shin, "Compact Models for Memristors Based on Charge-Flux Constitutive Relationships", IEEE, pp. 590-598 (Year: 2009).*
Lu, "Training Resistive Switches (Memristors) for Memory and Logical Application", IEEE, pp. 217-223 (Year: 2011).*
Vincent, "Spin-Transfer Torque Magnetic Memory as a Stochastic Memristive Synapse ", IEEE, pp. 1074-1077 (Year: 2014).*
PCT/IB2018/051224 International Search Report and Written Opinion, dated May 30, 2018.
Gokmen et al., "Acceleration of Deep Neural Network Training with Resistive Cross-Point Devices: Design considerations," arxiv.org/pdf/1603.07341v1, Mar. 23,2016, pp. 1-21.
Examination Report for GB Application No. 1913458.4 dated Oct. 23, 2019, 4 pages.
Gokmen, T. & Vlasov Y., "Acceleration of Deep Neural Network Training with Resistive Cross-Point Devices: Design Consideration," Frontiers in Neuroscience, Original Research, Jul. 21, 2016, 14 pages.

* cited by examiner

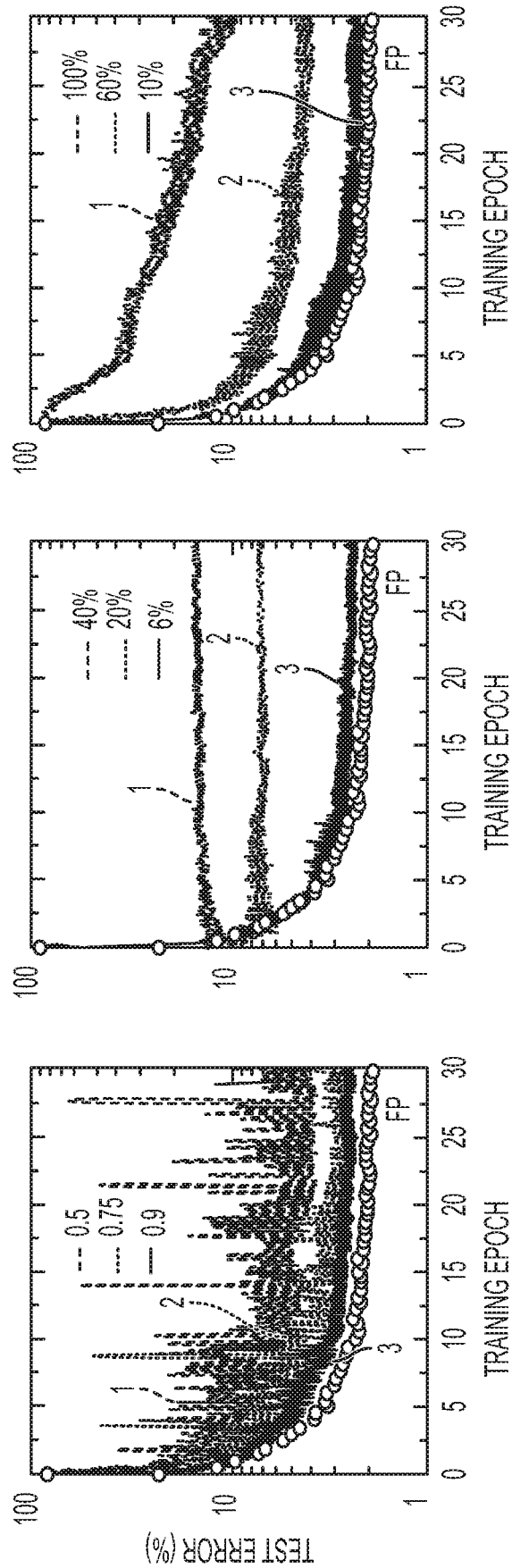

TABLE 1

| SYSTEM | THROUGHPUT (TeraOps/s) | POWER (W) | POWER EFFICIENCY (G-Ops/s/W) | NETWORK SIZE (NUMBER OF WEIGHTS) | ACCELERATION VS CPU |
|---|---|---|---|---|---|
| CPU Power8 12 CORES | 0.676 | 250 | 2.7 | - | 1 |
| GPU NVidia TESLA K40 | 4.3 | 242 | 17.8 | - | 6.4 |
| DESIGN 1 | 5,000 | 250 | 20,100 | 200 M | 7,400 |
| DESIGN 2 | 21,000 | 250 | 83,800 | 840 M | 31,000 |
| DESIGN 3 | 420 | 22 | 19,000 | 1,680 M | 620 |

FIG. 6

TABLE 2

| SPECS | PARAMETER | VALUE | TOLERANCE |
|---|---|---|---|
| PULSE DURATION | | 1 ns | |
| OPERATING VOLTAGE | $\pm V_s$ | 1 V | |
| MAXIMUM DEVICE AREA | | 0.04 $\mu m^2$ | |
| AVERAGE DEVICE RESISTANCE | $R_{DEVICE}$ | 24 M$\Omega$ | 7 M$\Omega$ |
| MAXIMUM DEVICE RESISTANCE | MAX($g_{ij}$) | 112 M$\Omega$ | 7 M$\Omega$ |
| MINIMUM DEVICE RESISTANCE | MIN($g_{ij}$) | 14 M$\Omega$ | 7 M$\Omega$ |
| RESISTANCE ON/OFF RATIO | MAX($g_{ij}$) / MIN($g_{ij}$) | 8 | |
| RESISTANCE CHANGE AT $\pm V_s$ | $\Delta g^{\pm}_{MIN}$ | 100 K$\Omega$ | 30 K$\Omega$ |
| RESISTANCE CHANGE AT $\pm V_s/2$ | | 10 K$\Omega$ | |
| STORAGE CAPACITY | (MAX($g_{ij}$) - MIN($g_{ij}$)) / $\Delta g_{MIN}$ | 1000 LEVELS | |
| DEVICE UP/DOWN ASYMMETRY* | $\Delta g^+_{MIN} / \Delta g^-_{MIN}$ | 1.05 | 2% |

FIG. 7

RESISTIVE PROCESSING UNIT WITH HYSTERETIC UPDATES FOR NEURAL NETWORK TRAINING

STATEMENT REGARDING PRIOR DISCLOSURES BY THE INVENTOR OR A JOINT INVENTOR

The following disclosure is submitted under 35 U.S.C. 102(b)(1)(A):

DISCLOSURE

"Acceleration of Deep Neural Network Training with Resistive Cross-Point Devices: Design Considerations" by Tayfun Gokmen and Yurii Vlasov, published Jul. 21, 2016 in Front. Neurosci. 10:333, pages 1-13, which is incorporated herein by reference.

BACKGROUND

The present invention relates in general to computing systems, and more specifically to resistive processing unit (RPU) devices with hysteretic updates for neural network training.

"Machine learning" is used to broadly describe a primary function of electronic systems that learn from data. In machine learning and cognitive science, artificial neural networks (ANNs) or deep neural networks (DNNs) are a family of statistical learning models inspired by the biological neural networks of animals, and in particular the brain. ANNs can be used to estimate or approximate systems and functions that depend on a large number of inputs and are generally unknown. ANNs are formed from crossbar arrays of two-terminal RPUs. Crossbar arrays are high density, low cost circuit architectures used to form a variety of electronic circuits and devices, including ANN architectures, neuromorphic microchips and ultra-high density nonvolatile memory. A basic crossbar array configuration includes a set of conductive row wires and a set of conductive column wires formed to intersect the set of conductive row wires. The intersections between the two sets of wires are separated by so-called cross-point devices, which can be formed from thin film material.

SUMMARY

According to one or more embodiments, a resistive processing unit (RPU) array is provided. The RPU array includes a set of conductive row wires, and a set of conductive column wires configured to form a plurality of cross-points at intersections between the set of conductive row wires and the set of conductive column wires. A plurality of two-terminal RPUs are hysteretic such that the plurality of two-terminal RPUs each have a conductance state defined by hysteresis. A two-terminal RPU of the plurality of two-terminal RPUs is located at each of the plurality of cross-points.

According to one or more embodiments, a method of forming a resistive processing unit (RPU) array is provided. The method providing a set of conductive row wires, and providing a set of conductive column wires configured to form a plurality of cross-points at intersections between the set of conductive row wires and the set of conductive column wires. The method includes providing a plurality of two-terminal RPUs that are hysteretic such that the plurality of two-terminal RPUs each have a conductance state defined by hysteresis. A two-terminal RPU of the plurality of two-terminal RPUs is located at each of the plurality of cross-points.

According to one or more embodiments, a method for hysteresis operation is provided. The method includes causing update pulses to be received by at least one hysteretic resistive processing unit (RPU), and causing the at least one hysteretic RPU to have a change in a conductance state in response to the update pulses. The change in the conductance state has a delay for a predefined amount of the update pulses.

BRIEF DESCRIPTION OF THE DRAWINGS

FIG. 3G is a graph of the test error according to one or more embodiments.

FIG. 3H is a graph of the test error according to one or more embodiments.

FIG. 3I is a graph of the test error according to one or more embodiments.

FIG. 6 is a table summarizing a comparison of various RPU system designs versus state-of-the-art according to one or more embodiments.

FIG. 7 is a table summarizing RPU device specifications according to one or more embodiments.

DETAILED DESCRIPTION

Figure 1A:
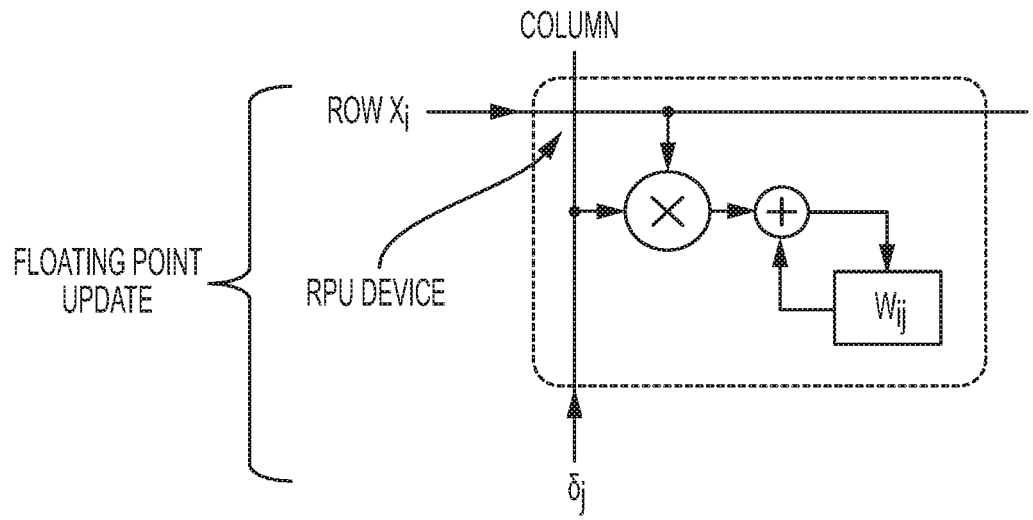
FIG. 1A is a schematic of original weight update rule of Equation (1) performed at each cross-point.

ANNs or deep neural networks (DNNs) are often embodied as so-called "neuromorphic" systems of interconnected processor elements that act as simulated "neurons" and exchange "messages" between each other in the form of electronic signals. Similar to the so-called "plasticity" of synaptic neurotransmitter connections that carry messages between biological neurons, the connections in ANNs that carry electronic messages between simulated neurons are provided with numeric weights that correspond to the strength or weakness of a given connection. The weights can be adjusted and tuned based on experience, making ANNs adaptive to inputs and capable of learning. For example, an ANN for handwriting recognition is defined by a set of input neurons which can be activated by the pixels of an input image. After being weighted and transformed by a function determined by the network's designer, the activations of these input neurons are then passed to other downstream neurons, which are often referred to as "hidden" neurons. This process is repeated until an output neuron is activated. The activated output neuron determines which character was read.

Crossbar arrays, also known as cross-point arrays or crosswire arrays, are high density, low cost circuit architectures used to form a variety of electronic circuits and devices, including ANN architectures, neuromorphic microchips and ultra-high density nonvolatile memory. A basic crossbar array configuration includes a set of conductive row wires and a set of conductive column wires formed to intersect the set of conductive row wires. The intersections between the two sets of wires are separated by so-called cross-point devices, which can be formed from thin film material.

Cross-point devices, in effect, function as the ANN's weighted connections between neurons. Nanoscale two-terminal devices, for example memristors having "ideal" conductance state switching characteristics, are often used as the cross-point devices in order to emulate synaptic plasticity with high energy efficiency. The conductance state (e.g., inverse of resistance) of the ideal memristor material can be altered by controlling the voltages applied between individual wires of the row and column wires. Digital data can be stored by alteration of the memristor material's conductance state at the intersection to achieve a high conduction state or a low conduction state. The memristor material can also be programmed to maintain two or more distinct conductance states by selectively setting the conductance state of the material. The conductance state of the memristor material can be read by applying a voltage across the material and measuring the current that passes through the target cross-point device.

In order to limit power consumption, the cross-point devices of ANN chip architectures are often designed to utilize offline learning techniques, wherein the approximation of the target function does not change once the initial training phase has been resolved. Offline learning allows the cross-point devices of crossbar-type ANN architectures to be simplified such that they draw very little power.

Notwithstanding the potential for lower power consumption, executing offline training can be difficult and resource intensive because it is typically necessary during training to modify a significant number of adjustable parameters (e.g., weights) in the ANN model to match the input-output pairs for the training data. Accordingly, simplifying the cross-point devices of ANN architectures to prioritize power-saving, offline learning techniques typically means that training speed and training efficiency are not optimized.

One or more embodiments of the invention provide an array of resistive devices to be used for deep neural network training. Although examples of deep neural network training might be discussed, it should be appreciated that embodiments are not limited to the type of examples discussed herein. The resistive devices are called resistive processing units (RPUs), cross-point devices, etc. and one or more embodiments describe how the RPU device can be utilized to train deep neural networks composed of fully connected layers, convolutional layers, etc. Performing various DNN training with different imperfections on RPU devices can be derived from the required RPU device specifications. Among all device specifications the asymmetry in response to up and down changes has the least tolerance such as, for example, only up to 5-6% asymmetry on an RPU device. In one or more embodiments, experimenters illustrate how to increase the tolerance by introducing hysteresis updates in RPUs. Hysteresis is purposefully engineered into the RPU devices, and hysteretic RPU devices are used for DNN training because hysteresis is not harmful (although this approach might be counterintuitive to the state-of-the-art RPU devices).

Asymmetry in the RPU device causes an imbalance in the up and down changes in conductance of the RPU device. Embodiments are configured to address the issue of asymmetry in RPU devices and therefore improve the imbalance. Embodiments introduce hysteric updates to the RPU device so that tolerance to the imbalance can be significantly increased. More particularly, embodiments perform neural network training with RPU device that have hysteresis in their switching behavior (which is the up and down switching behavior in the conductance in response to an update). Since hysteresis is not harmful, hysteric RPU device can be utilized even if they are balanced (i.e., their up and down changes in conductance are balanced).

Figure 8:
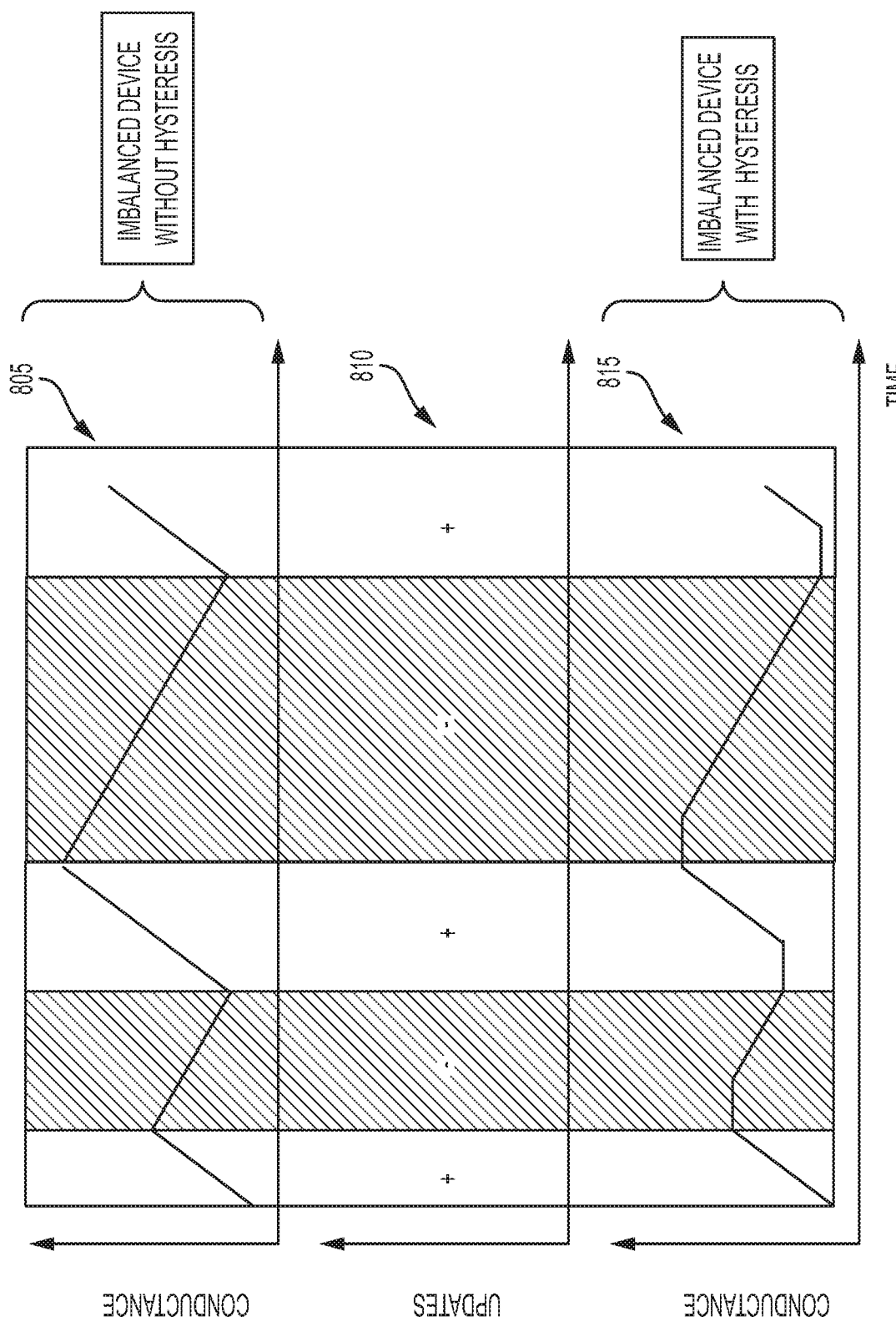
FIG. 8 depicts conductance changes for imbalanced RPU devices with hysteresis versus imbalanced devices RPU devices without hysteresis according to one or more embodiments.

To further illustrate how RPU devices with hysteresis are utilized to improve the up and down changes in conductance for an RPU device, FIG. 8 depicts a hysteresis model according to one or more embodiments. It should be appreciated that the hysteresis model in FIG. 8 applies to any of the RPU devices discussed herein (such as in FIGS. 1-7 and 9-16). Although the hysteresis model is for RPU devices that have asymmetry such that there is an imbalance in the up and down changes in conductance value, it should be appreciated that the hysteresis model can apply to balanced RPU devices too (which do not have asymmetry). In FIG. 8, graph 805 depicts the conductance value, or more particularly, the change in conductance value over time for an imbalanced RPU device without hysteresis. Graph 815 depicts the conductance value (particularly, the change in conductance value) over time for an imbalanced RPU device with hysteresis. Graph 810 illustrates the updates (e.g., update weight cycle pulse by the backpropagation algorithm) input to the RPU device without hysteresis and the RPU device with hysteresis.

As can be seen in both graph 805 and 810, the change in sign (+ or −) for the input update pulse in graph 805 causes a directional change conductance value in graphs 805 and 810. A positive sign (+) for the update pulse causes an increase in conductance value which is illustrated as a positive slope (i.e., upward direction) for the conductance curve in both graphs 805 and 815. A negative sign (−) for the update pulse causes a decrease in conductance value which is illustrated as a negative slope (i.e., downward direction) for the conductance curve in both graphs 805 and 815. However, the hysteretic RPU device depicted for graph 815 has a delay in switching from an increase in conductance value (i.e., positive slope) to a decrease in conductance value (negative slope) as well as in switching from a decrease in conductance value to an increase in conductance value. It is recognized that the asymmetry in RPU devices is difficult to correct. However, the hysteresis (which causes a delay in switching) improves the RPU device's tolerance to the imbalance caused by asymmetry.

During a neural network training, each RPU device gets many updates. When a device gets random updates along the (+) and (−) directions, for a balanced RPU device, these random updates cancel out and do not cause a net weight change. However, for an asymmetric RPU device, these random updates causes a drift component and tends to move the weight along the asymmetry direction. This undesired drift component due to asymmetry is mitigated by a hysteretic device, as discussed in embodiments. Hysteresis filters the highly random up and down weight updates and therefore effectively reduces shortcomings of an asymmetry, according to embodiments.

Figure 9:
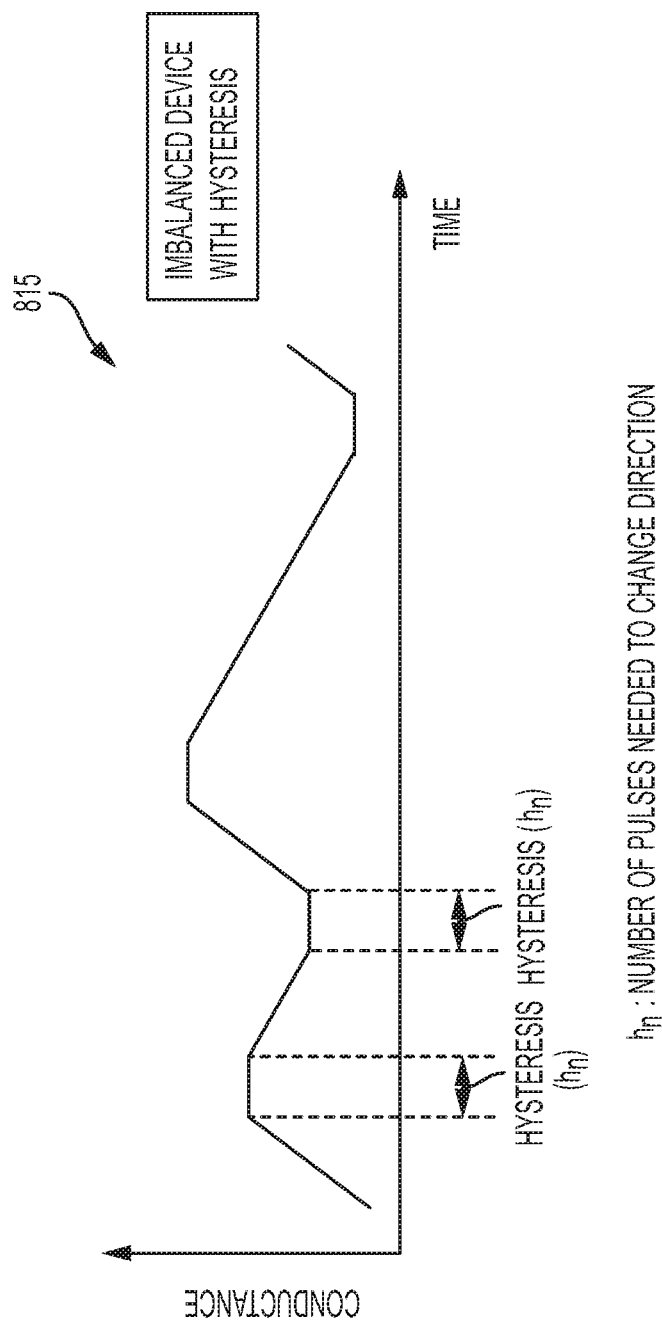
FIG. 9 depicts a hysteresis model showing the relationship between the hysteresis amount and the number of update pulses according to one or more embodiments.

FIG. 9 depicts a hysteresis model showing the relationship between the hysteresis amount and the number of update pulses according to one or more embodiments. As an example, graph 815 for the imbalanced RPU device with hysteresis is depicted in FIG. 9. Hysteresis amount $h_n$ is identified as the flat or zero slope for the conductance and the hysteresis occurs at changes/switches in the up and down conductance value. The hysteresis amount $h_n$ is the number of pulses needed to change direction (i.e., change the conductance value from up to down or down to up). The hysteresis amount $h_n$ can be set/designed. In one embodiments, the hysteresis amount $h_n$ can be set 2 update pulses, 10 update pulses, 100 update pulses, etc.

Additionally, the hysteresis amount is equal for (−) and (+) changes in conductance. That is, the time interval for hysteresis is the same for each occurrence of hysteresis in the RPU device. It is noted that $\Delta g$ is the change in the RPU's conductance value in response to the voltage sequences applied at $x_1$ and $\delta_j$. Thus, $\Delta g$ is the response of RPU to a voltage pulse (i.e., update pulse). Different RPU devices can show different amounts of change in the conductance value due to positive ($\Delta g^+_{min}$) and negative ($\Delta g^-_{min}$) pulses, for example due to differences in fabrication. Additionally, there is an average of how much weight change $\Delta w$ will be obtained by the positive and negative pulsing scheme. Asymmetric RPU devices in an RPU array with different $\Delta w^+_{min}$ and $\Delta w^-_{min}$ adversely affect the DNN training.

Further discussion is provided below regarding training (such as, for example, DNN training) with resistive cross-point device (i.e., RPU devices). For ease of understanding and explanation, sub-headings are utilized.

DNN demonstrated significant success with performance exceeding sophisticated prior methods in speech and object recognition. However, training the DNNs is an extremely computationally intensive task that requires massive computational resources and enormous training time that hinders their further application. For example, a 70% relative improvement has been demonstrated for a DNN with 1 billion connections that was trained on a cluster with 1000 machines for three days Training the DNNs relies in general on the backpropagation algorithm that is intrinsically local and parallel. For further details of the backpropagation algorithm reference can be made to "Learning representations by back-propagating errors" in *Nature* 323, 533-536, by Rumelhart, D. E., Hinton, G. E., and Williams, R. J. (1986), which is incorporated herein by reference. Various hardware approaches to accelerate DNN training that are exploiting this locality and parallelism have been explored with a different level of success starting to current developments with GPU, FPGA, or specially designed ASIC. Further acceleration is possible by fully utilizing the locality and parallelism of the algorithm. For a fully connected DNN layer that maps N neurons to N neurons significant acceleration can be achieved by minimizing data movement using local storage and processing of the weight values on the same node and connecting nodes together into a massive N×N systolic array where the whole DNN can fit in. Instead of a usual time complexity of $O(N^2)$ the problem can be reduced therefore to a constant time $O(1)$ independent of the array size. However, the addressable problem size is limited to the number of nodes in the array which is challenging to scale up to billions even with the most advanced CMOS technologies. Novel nanoelectronic device concepts based on non-volatile memory (NVM) technologies, such as phase change memory (PCM) and resistive random access memory (RRAM), have been explored recently for implementing neural networks with a learning rule inspired by spike-timing-dependent plasticity (STDP) observed in biological systems. Only recently, their implementation for acceleration of DNN training using backpropagation algorithm have been considered with reported acceleration factors ranging from 27× to 900×, and even 2140× and significant reduction in power and area. All of these bottom-up approaches of using previously developed memory technologies looks very promising. However, the estimated acceleration factors are limited by device specifications intrinsic to their application as NVM cells. Device characteristics usually considered beneficial or irrelevant for memory applications such as high on/off ratio, digital bit-wise storage, and asymmetrical set and reset operations, are becoming limitations for acceleration of DNN training. These non-ideal device characteristics can potentially be compensated with a proper design of peripheral circuits and a whole system, but only partially and with a cost of significantly increased operational time.

In contrast, experimenters provide a top-down approach where ultimate acceleration of DNN training is achieved by design of a system and CMOS circuitry that imposes specific requirements for resistive devices according to one or more embodiments. Experimenters provide a concept of Resistive Processing Unit (RPU) devices that can simultaneously store and process weights and are scalable to billions of nodes with foundry CMOS technologies. As opposed to other approaches in the state-of the-art, the final RPU device characteristic that come out of this analysis allow a single device to perform all the operations required by the algorithm without additional circuit components. Estimates indicate that acceleration factors close to 30,000× are achievable on a single chip with realistic power and area constraints.

Definition of the RPU Device Concept

The backpropagation algorithm is composed of three cycles. The three cycles are forward, backward, and weight update which are repeated many times until a convergence criterion is met. The forward and backward cycles mainly involve computing vector-matrix multiplication in forward and backward directions. This operation can be performed on a 2D crossbar array of two-terminal resistive. In forward cycle, stored conductance values in the crossbar array form a matrix, where the input vector is transmitted as voltage pulses through each of the input rows. In a backward cycle, when voltage pulses are supplied from columns as an input, then the vector-matrix product is computed on the transpose of a matrix. These operations achieve the required O(1) time complexity, but only for two out of three cycles of the training algorithm.

In contrast to forward and backward cycles, implementing the weight update on a 2D crossbar array of resistive devices locally and all in parallel, independent of the array size, can seem challenging. The weight update includes calculating a vector-vector outer product which consists of a multiplication operation and an incremental weight update to be performed locally at each cross-point as illustrated in FIG. 1A. The corresponding update rule is usually expressed as $$w_{ij} \leftarrow w_{ij} + \eta x_i \delta_j \qquad \text{Eq. (1)}$$

where $w_{ij}$ represents the weight value for the $i^{th}$ row and the $j^{th}$ column (for simplicity layer index is omitted), $x_i$ is the activity at the input neuron, $\delta_j$ is the error computed by the output neuron, and $\eta$ is the global learning rate. The $i^{th}$ row and the $j^{th}$ column intersect at the RPU device.

Figure 1B:
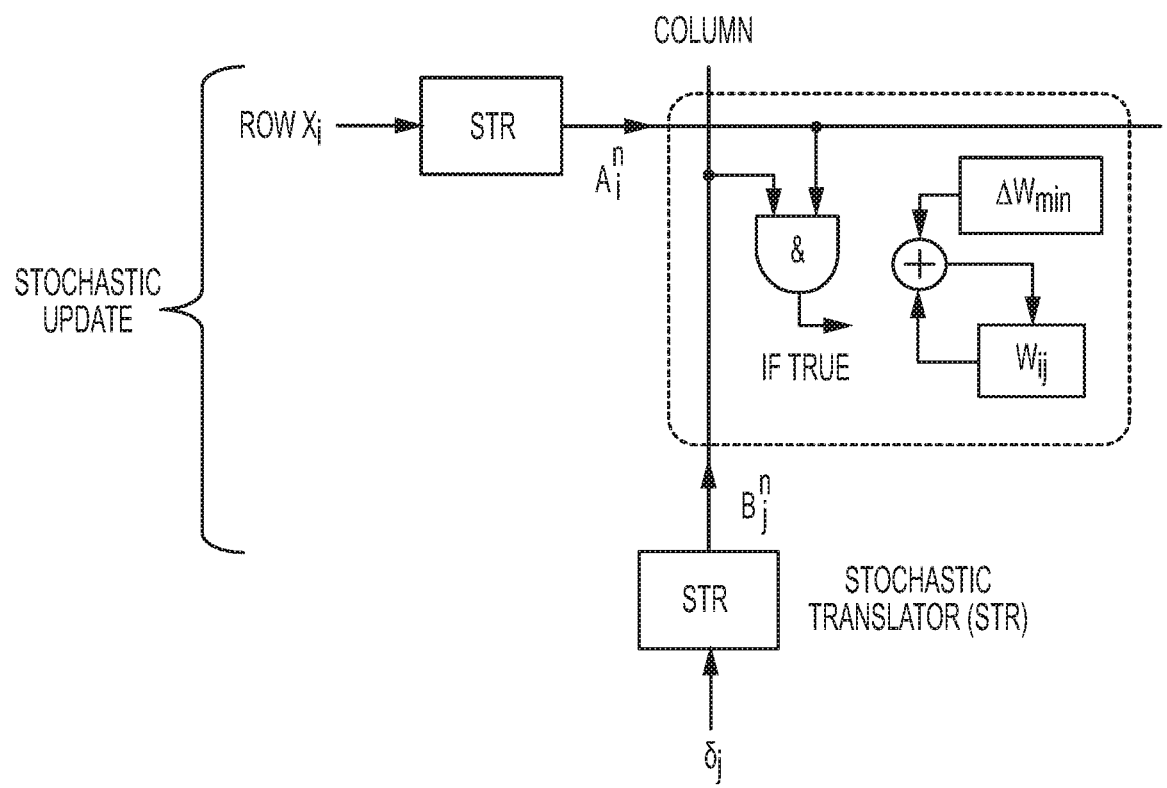
FIG. 1B is schematic of a stochastic update rule of Equation (2) that uses a simple "AND" operation at each cross-point according to one or more embodiments.

In order to implement a local and parallel update on an array of two-terminal devices that can perform both weight storage and processing (RPU), experimenters first decided to significantly simplify the multiplication operation itself by using stochastic computing techniques. It has been shown that by using two stochastic streams the multiplication operation can be reduced to a simple AND operation. For example, FIG. 1B illustrates the stochastic update rule where numbers that are encoded from neurons ($x_i$ and $\delta_j$) are translated to stochastic bit streams using stochastic translators (STR). Then they are sent to the crossbar array where each RPU device changes its conductance ($g^-_{ij}$) slightly when bits from $x_i$ and $\delta_j$ coincide. In this scheme, experimenters can write the update rule as follows.

$$w_{ij} \leftarrow w_{ij} \pm \Delta w_{min} \sum_{n=1}^{BL} A_i^n \wedge B_j^n \qquad \text{Eq. (2)}$$

where BL is the length of the stochastic bit stream at the output of STRs that is used during the update cycle, $\Delta w_{min}$ is the change in the weight value due to a single coincidence event, $A_i^n$ and $B_j^n$ are random variables that are characterized by a Bernoulli process, and the superscript n represents the bit position in the trial sequence. The probabilities that $A_i^n$ and $B_j^n$ are equal to unity are given by $Cx_i$ and $C\delta_j$, respectively, where C is a gain factor in the STR.

Figure 1C:
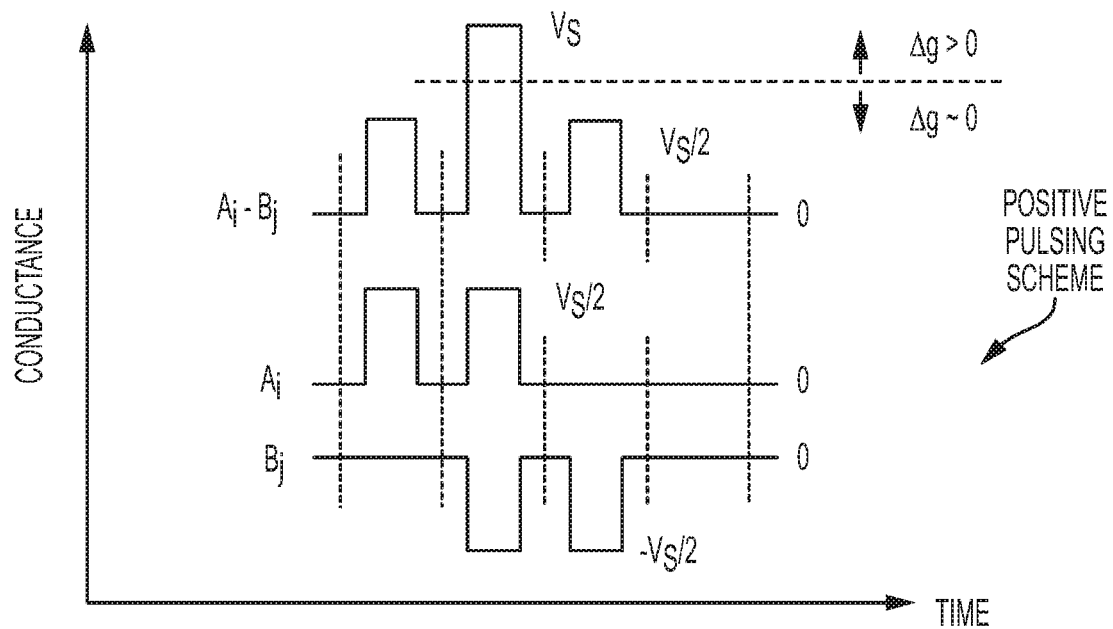
FIG. 1C is a pulsing scheme that enables implementation of the stochastic updates rule by RPU devices for up conductance changes according to one or more embodiments.
Figure 1D:
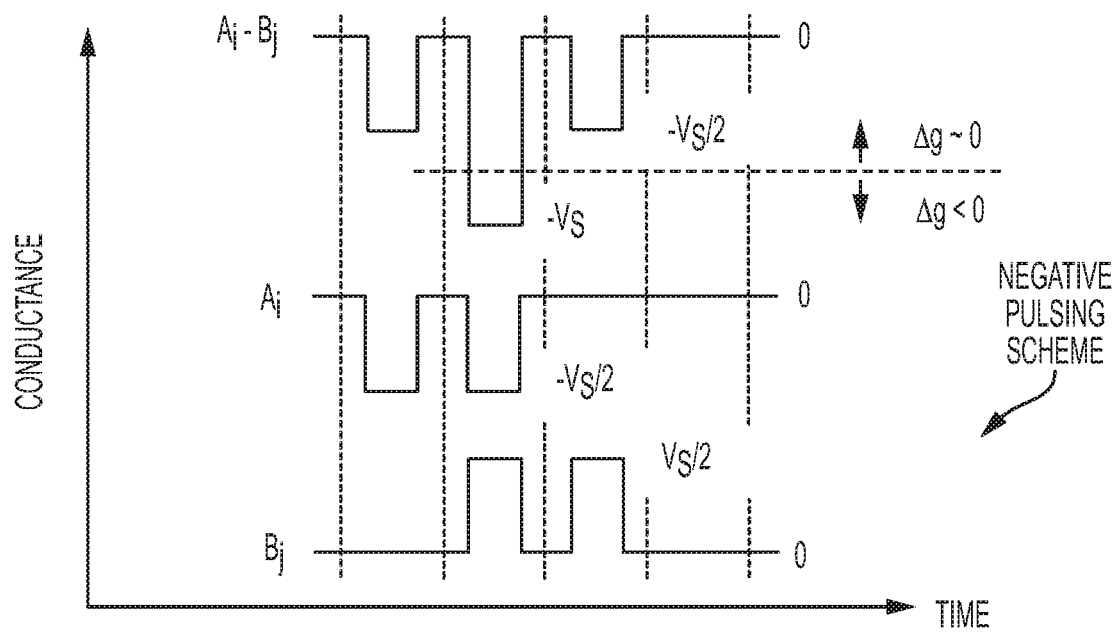
FIG. 1D is a pulsing scheme that enables implementation of the stochastic updates rule by RPU devices for down conductance changes according to one or more embodiments.

One pulsing scheme that enables the stochastic update rule of Equation (2) is presented in FIG. 1C. The voltage pulses with positive and negative amplitudes are sent from corresponding STRs on rows ($A_i$) and columns ($B_j$), respectively. As opposed to a floating point number encoded into a binary stream, the corresponding number translated into a stochastic stream is represented by a whole population of such pulses. In order for a two-terminal RPU device to distinguish coincidence events at a cross-point, its conductance value should not change significantly when a single pulse amplitude is half of the switching voltage ($V_S$) of the device. However, when two pulses coincide and the RPU device sees the full voltage ($V_S$) the conductance should change by a nonzero amount $\Delta g_{min}$. The parameter $\Delta g_{min}$ is proportional to $\Delta w_{min}$ through the amplification factor defined by peripheral circuitry. To enable both up and down changes in conductance, the polarity of the pulses can be switched during the update cycle as shown in FIG. 1D. The sign of the multiplication is determined by the polarity of the pulses that are used during the update cycle. Therefore, for $x_i>0$ cases, the signed multiplication can be performed by populating the rows corresponding to $x_i>0$ during both up and down cycles while the columns are populated selectively either at the up or the down cycle depending on the sign of $\delta_j$. Similar operation can be repeated if there exists negative values ($x_i<0$) for some of the rows. The proposed pulsing scheme allows all the RPU devices in an array to work in parallel and perform the multiplication operation locally by simply relying on the statistics of the coincidence events, thus achieving the O(1) time complexity for the weight update cycle of the training algorithm.

It should be recognized that FIG. 1A is schematic of original weight update rule of Equation (1) performed at each cross-point, and FIG. 1B is a schematic of stochastic update rule of Equation (2) that uses simple AND operation at each cross-point. The pulsing scheme that enables the implementation of stochastic updates rule by RPU devices for up conductance changes is illustrated in FIG. 1C and for down conductance changes is illustrated in FIG. 1D.

Network Training with RPU Array Using a Stochastic Update Rule

To test the validity of this approach, experimenters compared classification accuracies achieved with a deep neural network composed of fully connected layers with 784, 256, 128, and 10 neurons, respectively. This network is trained with a standard MNIST (Mixed National Institute of Standards and Technology) training dataset of 60,000 examples of images of hand written digits using the cross-entropy objective function and the backpropagation algorithm. Raw pixel values of each 28×28 pixel image are given as inputs, while logistic sigmoid and softmax activation functions are used in hidden and output layers, respectively. The temperature parameter for both activation functions is assumed to be unity.

Figure 2A:
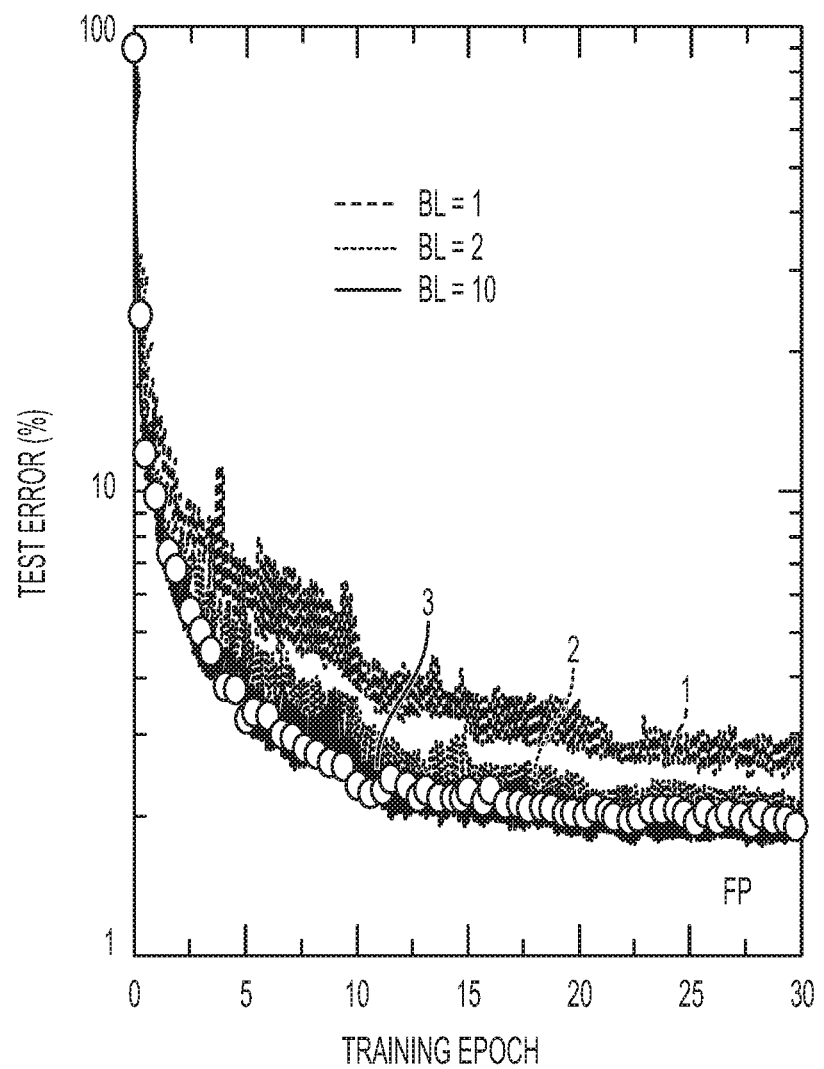
FIG. 2A is a graph of the test error for Equation (2) according to one or more embodiments.
Figure 2C:
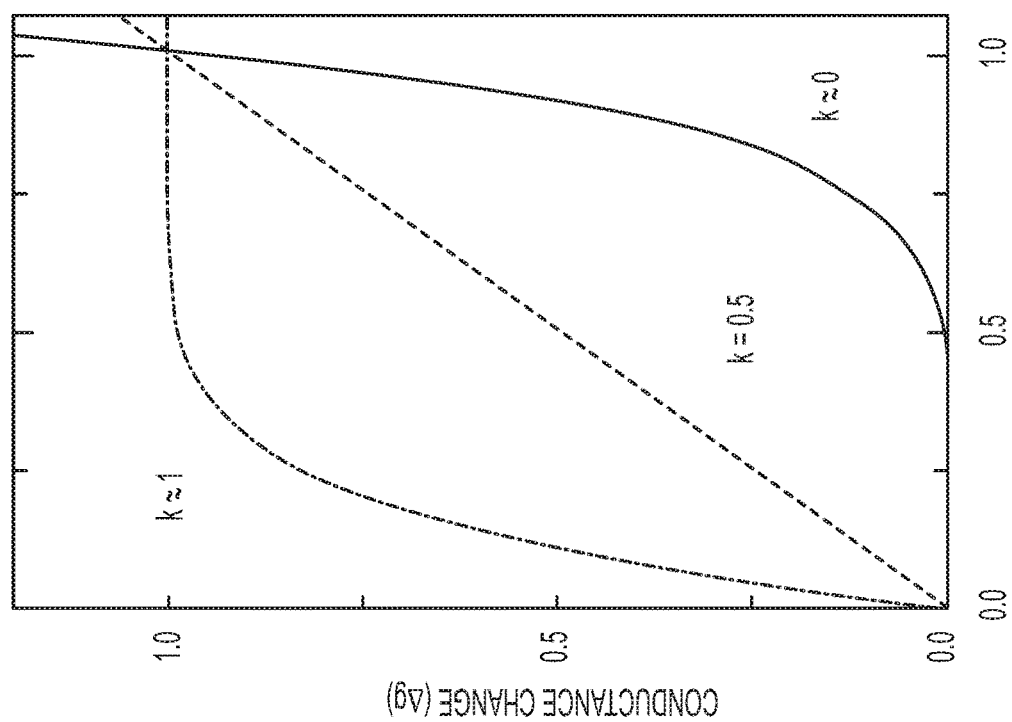
FIG. 2C illustrates various non-linear responses of RPU devices according to one or more embodiments.
Figure 2B:
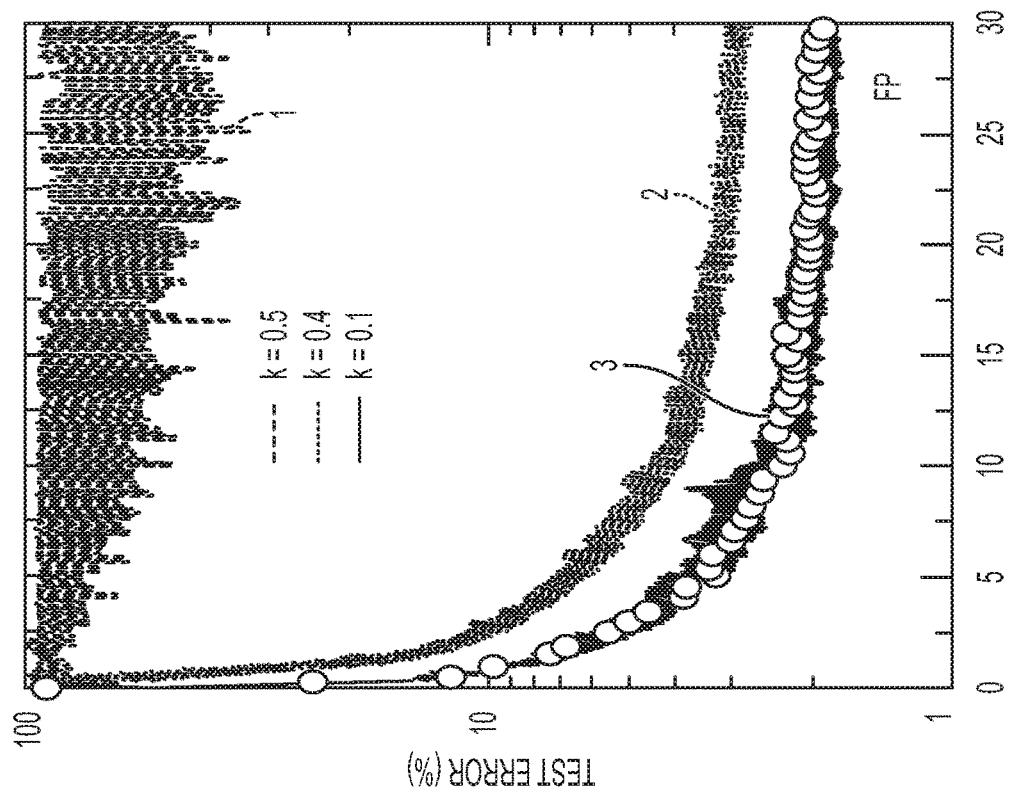
FIG. 2B is a graph of the test error for Equation (2) according to one or more embodiments.

FIGS. 2A, 2B, and 2C (generally referred to as FIG. 2) are related to the test error of DNN with the MNIST dataset. In FIG. 2B, lines marked as 1, 2, and 3 correspond to the stochastic model with BL=10, and the non-linearity ratio k=0.5, 0.4, and 0.1, respectively. FIG. 2C illustrates various non-linear responses of RPU device with k=0, 0.5, and 1.

More specifically, FIGS. 2A and 2B show a set of classification error curves for the MNIST test dataset of 10,000 images. The curve marked with open circles in FIG. 2A corresponds to a baseline model where the network is trained using the conventional update rule as defined by Equation (1) with a floating point multiplication operation, and the lines marked as 1, 2, and 3 correspond to the stochastic model of Equation (2) with stochastic bit lengths BL=1, 2, and 10, respectively. Here, the mini-batch size of unity is chosen throughout the following experiments. Training is performed repeatedly for all 60,000 images in the training dataset, and 60,000 images constitutes a single training epoch. Learning rates of η=0.01, 0.005, and 0.0025 for epochs 0-10, 11-20, and 21-30, respectively, are used. The baseline model reaches classification error of 2.0% on the test data in 30 epochs.

In order to make a fair comparison between the baseline model and the stochastic model in which the training uses the stochastic update rule of Equation (2), the learning rates need to match. In the most general form, the average change in the weight value for the stochastic model can be written as $$IE(w_{ij})=BL\Delta w_{min}C^2 x_i \delta_j \qquad \text{Eq. (3)}$$

Therefore the learning rate for the stochastic model is controlled by three parameters BL, $\Delta w_{min}$, and C which should be adjusted to match the learning rates that are used in the baseline model. Although the stochastic update rule allows one to substitute the multiplication operation with a simple AND operation, the result of the operation, however, is no longer exact, but probabilistic with a standard deviation to mean ratio that scales with $1/\sqrt{BL}$. Increasing the stochastic bit stream length BL would decrease the error, but in turn would increase the update time. In order to find an acceptable range of BL values that allow the network to reach classification errors similar to the baseline model, the experimenters performed training using different BL values while setting $\Delta w_{min}=\eta/BL$ and C=1 in order to match the learning rates used for the baseline model as discussed above. As it is shown in FIG. 2A, BL as small as 10 is sufficient for the stochastic model to become indistinguishable from the baseline model.

In addition, for the stochastic update rule the change in the weight value for a single update cycle is bounded by $BL \times \Delta w_{min}$ and this condition may happen if the probabilities of generating pulses from STRs ($Cx_i$ and $C\delta_j$) are close to unity or larger. The effect of this clipping in the weight update is also taken into account in the simulations and does not degrade the performance as shown in FIG. 2A for BL as small as 10.

To determine how strong non-linearity in the device switching characteristics is required for the algorithm to converge to classification errors comparable to the baseline model, a non-linearity factor is varied as shown FIG. 2B. The non-linearity factor is defined as the ratio of two conductance changes at half and full voltages as $k=\Delta g(V_S/2)/\Delta g(V_S)$. As shown in FIG. 2C, the values of k≈1 correspond to a saturating type non-linear response, when k=0.5 the response is linear as typically considered for an ideal memristor, and values of k≈0 correspond to a rectifying type non-linear response. As it is shown in FIG. 2B, the algorithm fails to converge for the linear response. However, a non-linearity factor k below 0.1 is enough to achieve classification errors comparable to the baseline model.

These results validate that although the updates in the stochastic model are probabilistic, classification errors can become indistinguishable from those achieved with the baseline model. The implementation of the stochastic update rule on an array of analog RPU devices with non-linear switching characteristics effectively utilizes the locality and the parallelism of the algorithm. As a result, the update time is becoming independent of the array size and is a constant value proportional to BL, thus achieving the required O(1) time complexity.

Derivation of RPU Device Specifications

Various materials, physical mechanisms, and device concepts have been analyzed in view of their potential implementation as cross-bar arrays for neural network training in the state-of-the-art. These technologies have been initially developed for storage class memory applications. It is not clear beforehand, however, whether intrinsic limitations of these technologies, when applied to realization of the proposed RPU concept, would result in a significant acceleration, or, in contrast, might limit the performance. For example, PCM devices can only increase the conductance during training, thus resulting in network saturation after a number of updates. This problem can be mitigated by a periodic serial reset of weights, however, with a price of lengthening the training time as it violates the O(1) time complexity.

According to one or more embodiments, in order to determine the device specifications required to achieve the ultimate acceleration when O(1) time complexity is reached, experimenters performed a series of trainings summarized in FIGS. 3A, 3B, 3C, 3D, 3E, 3F, 3G, 3H, and 3I (generally referred to as FIG. 3). In FIG. 3, each figure corresponds to a specific "stress test" where a single parameter is scanned (or varied) while all the others are fixed, thus allowing experimenters to explore the acceptable RPU device parameters that the algorithm can tolerate without significant error penalty. This includes variations in RPU device switching characteristics, such as, incremental conductance change due to a single coincidence event, asymmetry in up and down conductance changes, tunable range of the conductance values, and various types of noise in the system. A coincidence event is defined as the overlap of the two voltage pulses sent from the column (e.g., $\delta_j$) and the row ($x_i$) that an RPU device is connected to.

For all of the stochastic models illustrated in FIG. 3, k=0 and BL=10 are used. In order to match the learning rates used for the baseline model, the $x_i$ and $\delta_j$ are translated to stochastic streams with C defined as $C=\sqrt{\eta/(BL\Delta w_{min})}$. This allows the average learning rate to be the same as in the baseline model.

Figure 3A:
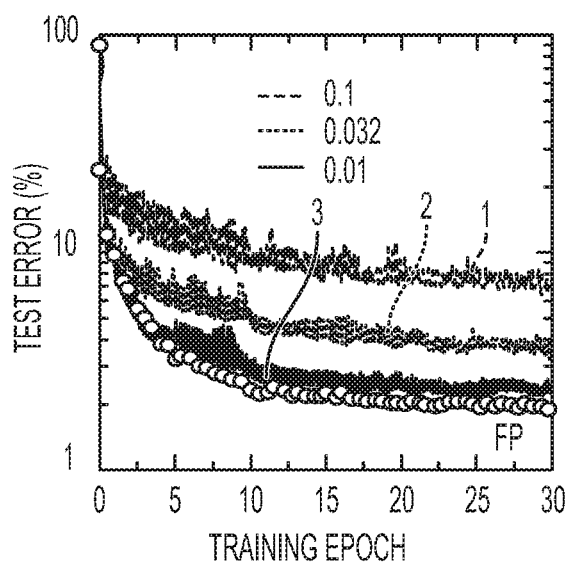
FIG. 3A is a graph of the test error according to one or more embodiments.

Ideally, the RPU device should be analog, i.e., the conductance change due to a single coincidence event $\Delta g_{min}$, should be arbitrarily small, thus continuously covering all the allowed conductance values. To determine the largest acceptable $\Delta g_{min}$ due to a single coincidence event that does not produce significant error penalty, the parameter $\Delta w_{min}$ is scanned (varied or changed) between 0.32 and 0.00032, while other parameters are fixed as shown in FIG. 3A. While for large $\Delta w_{min}$ the convergence is poor since $\Delta w_{min}$ controls the standard deviation of the stochastic update rule, and for smaller $\Delta w_{min}$ the results are approaching the baseline model. The $\Delta w_{min}$ smaller than 0.01 produces a classification error of 2.3% at the end of $30^{th}$ epoch which is just 0.3% above the 2.0% classification error of the baseline model. Lines 1, 2, and 3 correspond to a stochastic model with $\Delta w_{min}$=0.1, 0.032, and 0.01, respectively. All curves in FIGS. 3B-3I use $\Delta w_{min}$=0.001.

Figure 3B:
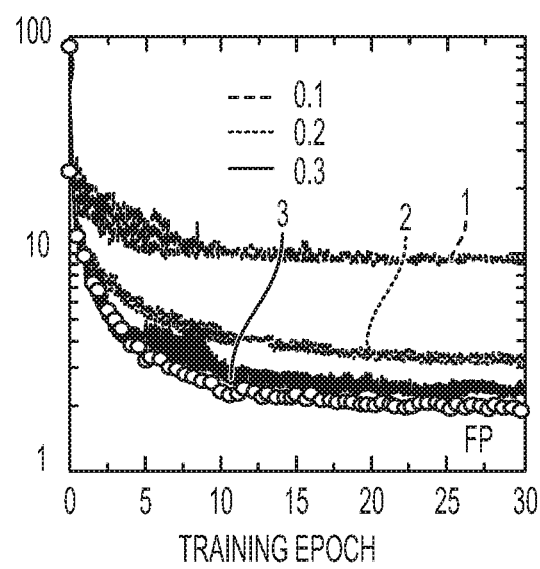
FIG. 3B is a graph of the test error according to one or more embodiments.
Figure 3C:
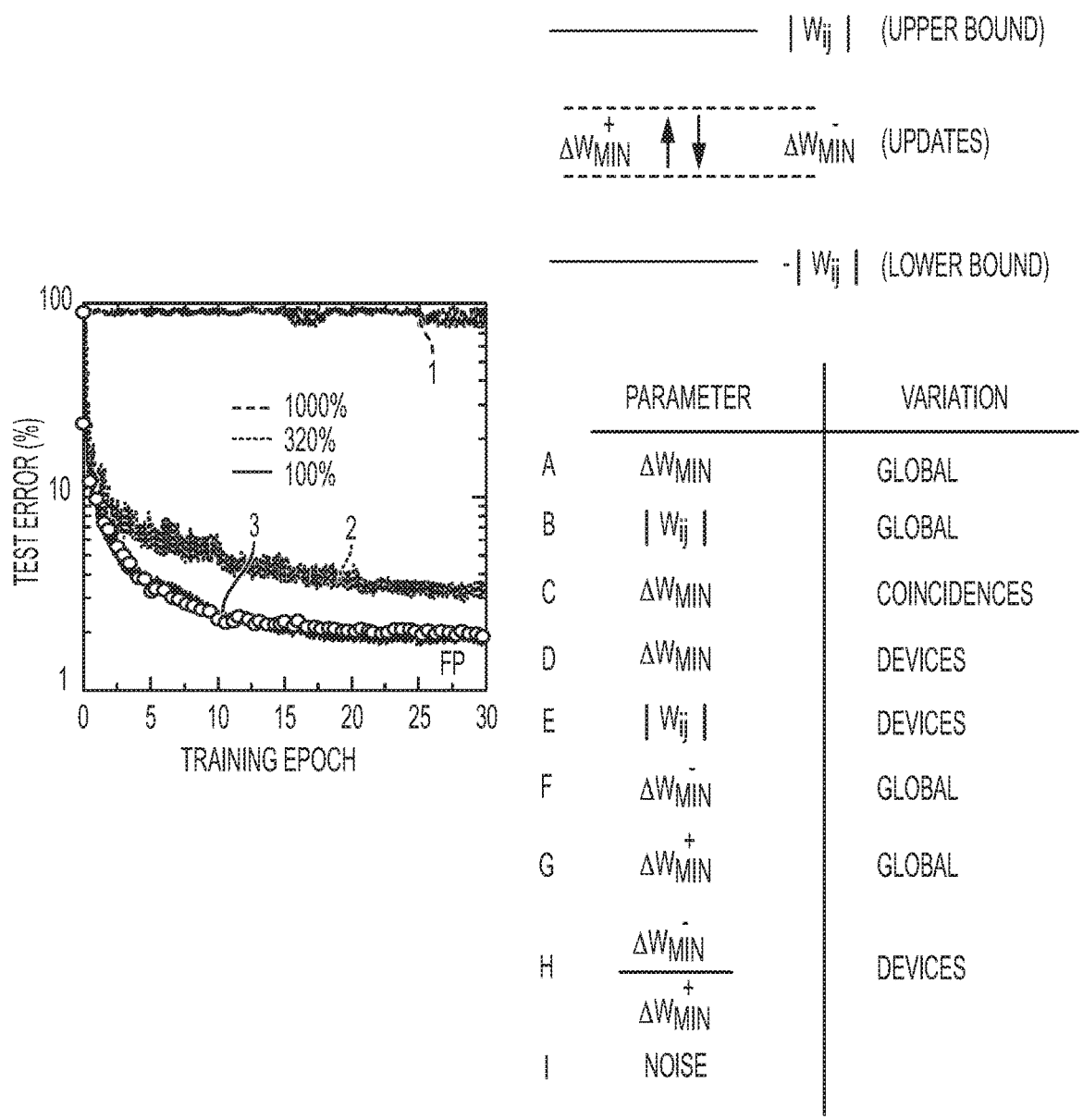
FIG. 3C is a graph of the test error according to one or more embodiments.

To determine minimum and maximum conductance values that RPU devices should support for the algorithm to converge, a set of training curves is calculated as shown in FIG. 3B. Each curve is defined by the weight range where the absolute value of weights $|w_{ij}|$ is kept below a certain bound that is varied between 0.1 and 3. Particularly, in FIG. 3B, lines 1, 2, and 3 correspond to a stochastic model with weights bounded to 0.1, 0.2, and 0.3, respectively. The other parameters are identical to FIG. 3A, while $\Delta w_{min}$ is taken as 0.001 to assure that the results are mostly defined by the choice of the weight range. The model with weights $|w_{ij}|$ bounded to values larger than 0.3 results in an acceptable error penalty criteria of 0.3% as defined above. Since the parameter $\Delta g_{min}$ (and $g_{ij}$) is proportional to $\Delta w_{min}$ (and $w_{ij}$) through the amplification factor defined by peripheral circuitry, the number of coincidence events required to move the RPU device from its minimum to its maximum conductance value can be derived as (max $(g_{ij})$–min $(g_{ij}))/\Delta g_{min}$= (max($w_{ij}$)–min ($w_{ij}$))/$\Delta w_{min}$. This gives a lower estimate for the number of states (e.g., 600 states) that are required to be stored on an RPU device. In order to determine the tolerance of the algorithm to the variation in the incremental conductance change due to a single coincidence event $\Delta g_{min}$, the $\Delta w_{min}$ value used for each coincidence event is assumed to be a random variable with a Gaussian distribution. Corresponding results are shown in FIG. 3C, where the standard deviation is varied while the average $\Delta w_{min}$ value is set to 0.001. In models of the experimenters, $\Delta w_{min}$ is allowed to have coincidence events that result in a change in the opposite direction if the random value is less than –1 (or –100%). As it is seen, the algorithm is robust against the randomness on the weight change for each coincidence event and models with a standard deviation below 150% of the mean value reach acceptable 0.3% error penalty. In FIG. 3C, lines 1, 2, and 3 correspond to a stochastic model with a coincidence-to-coincidence variation in $\Delta w_{min}$ of 1000%, 320%, and 100%, respectively.

Figure 3F:
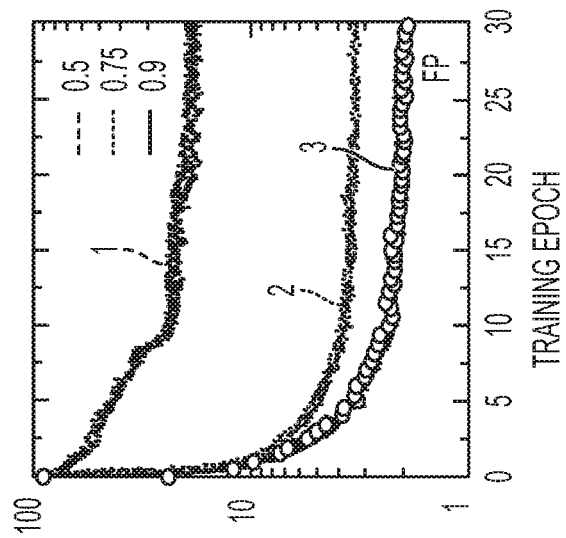
FIG. 3F is a graph of the test error according to one or more embodiments.
Figure 3E:
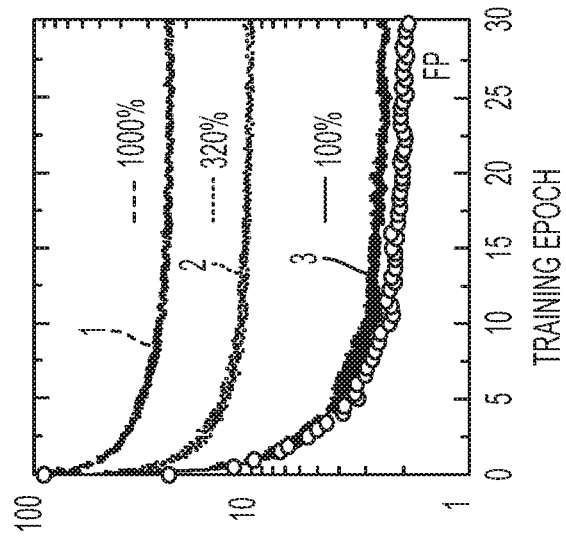
FIG. 3E is a graph of the test error according to one or more embodiments.
Figure 3D:
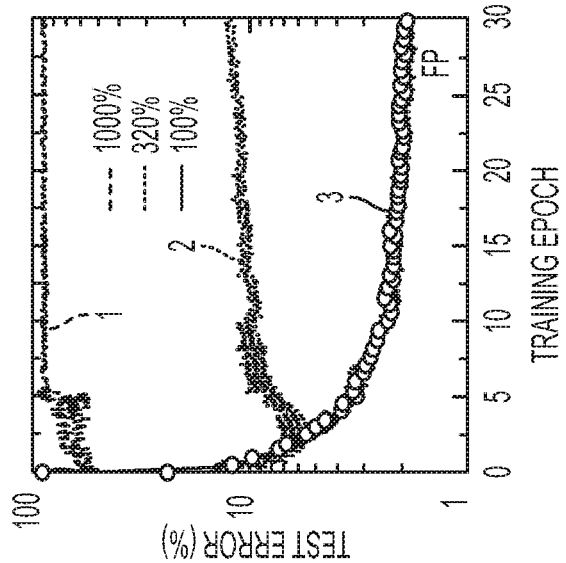
FIG. 3D is a graph of the test error according to one or more embodiments.

For stochastic models illustrated in FIG. 3D, a device-to-device variation (yet another randomness) in the incremental conductance change due to a single coincidence event $\Delta g_{min}$ is introduced. Particularly, in FIG. 3D, lines 1, 2, and 3 correspond to a stochastic model with device-to-device variation in $\Delta w_{min}$ of 1000, 320 and 100%, respectively. In this case, the $\Delta w_{min}$ used for each RPU device is sampled from a Gaussian distribution at the beginning of the training, and then this fixed value is used throughout the training for each coincidence event. For all stochastic models in FIG. 3D, the average $\Delta w_{min}$ value of 0.001 is used while the standard deviation is varied for each model. In models of the experimenters, the model is allowed to have some devices that perform updates in the opposite direction throughout the training if the random value is less than –1 (or –100%). Results show that the algorithm is also robust against the device-to-device variation and an acceptable error penalty can be achieved for models with a standard deviation up to 110% of the mean value. Device-to-device variation is defined as the variation of a parameter within the array for different RPU devices.

To determine tolerance of the algorithm to the device-to-device variation in the upper and lower bounds of the conductance value, the experimenters assume upper and lower bounds that are different for each RPU device for the models in FIG. 3E. The bounds used for each RPU device are sampled from a Gaussian distribution at the beginning of the training and are used throughout the training. For all of the stochastic models in FIG. 3E, mean value of 1.0 for upper bound (and –1.0 for lower bound) is used to assure that the results are mostly defined by the device-to-device variation in the upper and lower bounds. It is noted that as the standard deviation becomes large enough some devices may encode only positive or only negative weight values. Moreover, some devices might even have an upper bound that is smaller than the lower bound and those devices are assumed to be stuck at the middle point and do not respond to the updates. Including all of these contributions, FIG. 3E shows that the algorithm is robust against the variation in the bounds and models with a standard deviation up to 80% of the mean can achieve acceptable 0.3% error penalty. In FIG. 3E, lines 1, 2, and 3 correspond to a stochastic model with device-to-device variation in the upper and lower bounds of 1000%, 320% and 100%, respectively.

Fabricated RPU devices can also show different amounts of change in the conductance value due to positive pulses ($\Delta g_{min}^+$) and negative ($\Delta g_{min}^-$) pulses as illustrated in FIGS. 1C and 1D. To determine how much asymmetry between up and down changes the algorithm can tolerate, the up ($\Delta w_{min}^+$) and down ($\Delta w_{min}^-$) changes in the weight value are varied as shown in FIGS. 3F and 3G. In FIG. 3F, lines 1, 2, and 3 correspond to a stochastic model, where down changes are weaker by 0.5, 0.75, and 0.9, respectively. In FIG. 3G, lines 1, 2, and 3 correspond to a stochastic model, where up changes are weaker by 0.5, 0.75, and 0.9, respectively.

In both FIGS. 3F and 3G, this global asymmetry is considered to be uniform throughout the whole RPU device array. For each model in FIG. 3F, $\Delta w_{min}^+$ is fixed to 0.001 while $\Delta w_{min}^-$ is varied from 0.95 to 0.25 weaker than the up value. Similarly, FIG. 3G shows an analogous results for $\Delta w_{min}^-$ fixed to 0.001 while $\Delta w_{min}^+$ is varied. Results show that up and down changes need to be significantly balanced (10% with respect to each other) in order for the stochastic model to achieve an acceptable 0.3% error penalty. Experimenters define the threshold value with respect to the mean and therefore 5% imbalance is used as the acceptable threshold. It is noted that the large fluctuations seen in FIG. 3G but not in FIG. 3F is not surprising, and the fluctuations are not due to stochastic nature of the updates. Experimenters performed training using floating point multiplication with an imbalance term and still observed a similar behavior.

In order to determine tolerance of the algorithm to the device-to-device variation in asymmetry, as opposed to a global asymmetry considered in FIGS. 3F and 3G, the curves in FIG. 3H are calculated for various values of the standard deviation of $\Delta w_{min}^+/\Delta w_{min}^-$. The parameters $\Delta w_{min}^+$ and $\Delta w_{min}^-$ for each RPU device are sampled from a Gaussian distribution at the beginning of the training and then used throughout the training for each coincidence event. All the models assume that the average value of $\Delta w_{min}^+$ and $\Delta w_{min}^-$ is 0.001. The standard deviation of $\Delta w_{min}^+/\Delta w_{min}^-$ needs to be less than 6% of the mean value to achieve an acceptable 0.3% error penalty. In FIG. 3H, lines 1, 2, and 3 correspond to a stochastic model with device-to-device variation in the up and down that changes by 40, 20 and 6%, respectively.

Analog computation is sensitive to various noise sources such as thermal noise, shot noise, etc., that are all additive and can be modeled as a single unbiased Gaussian noise. Influence of noise penalty during the weight update cycle is already considered in FIGS. 3C, 3D, 3E, 3F, 3G, and 3H. In order to estimate tolerance of the algorithm to noise during forward and backward cycles, experimenters injected Gaussian noise to the results of vector-matrix multiplications with varying standard deviation. After the result of a vector-matrix multiplication is computed, an independent random noise is added to each element of the resulting vector. For the data shown in FIG. 3I, the same noise distribution is used both for the forward and the backward cycles and an acceptable 0.3% error penalty is reached for a noise with a standard deviation of 0.1. This value is 10% of the sigmoid neuron temperature parameter which is unity. However, the noise requirements for the forward and the backward cycles may not be identical. Indeed, calculations show that when experimenters introduce noise only to the forward cycle, the algorithm can tolerate up to six times larger noise with a 60% standard deviation. The backward cycle is less tolerant with a 10% threshold and therefore it dictates the threshold value derived from FIG. 3I. In FIG. 3I, lines 1, 2, and 3 correspond to a stochastic model with a noise in vector-matrix multiplication of 100%, 60%, and 10%, respectively, normalized on activation function temperature which is unity.

Figure 4A:
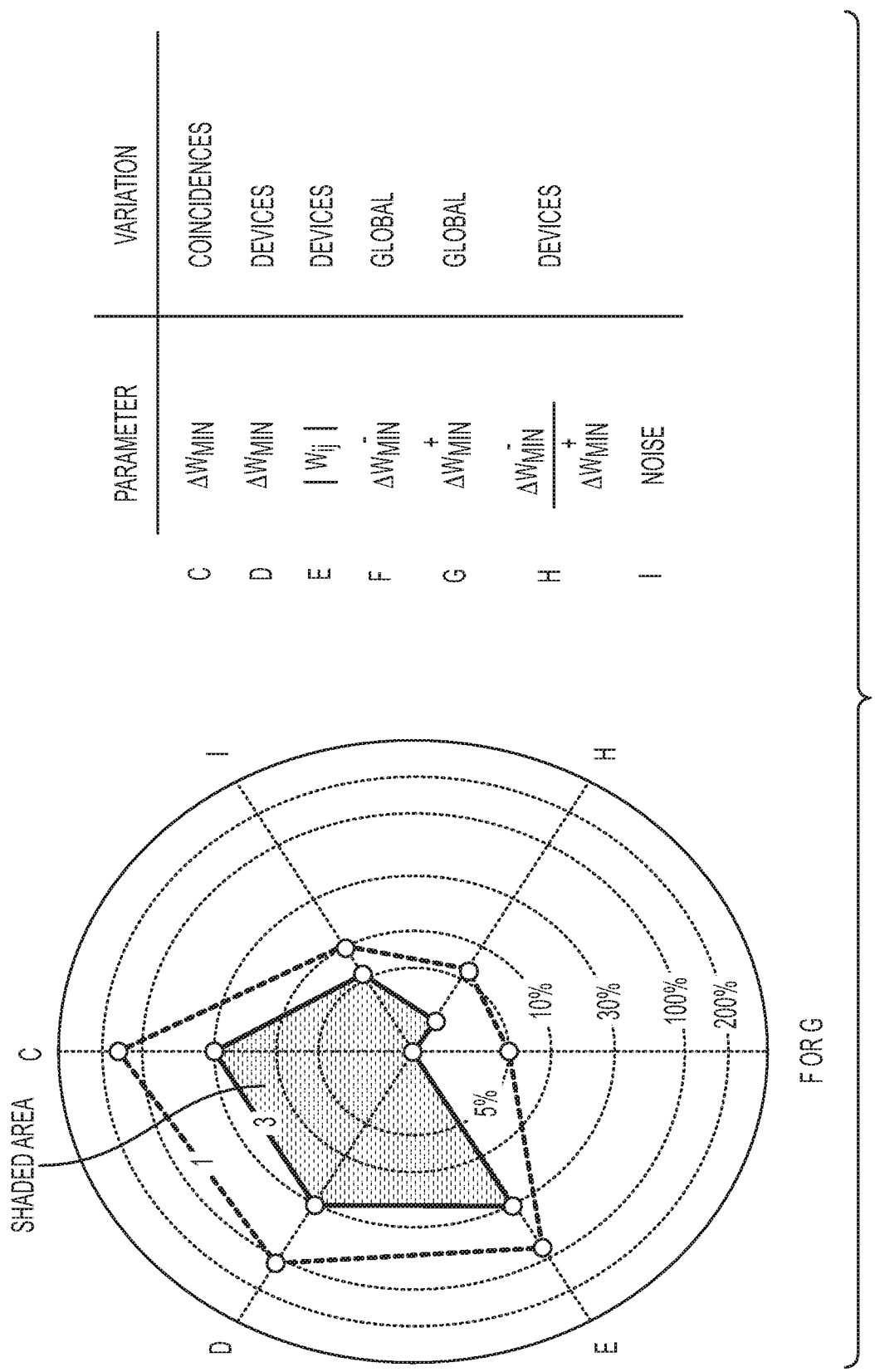
FIG. 4A is a radar diagram of the stress tests in FIGS. 3C-3I according to one or more embodiments.
Figure 4B:
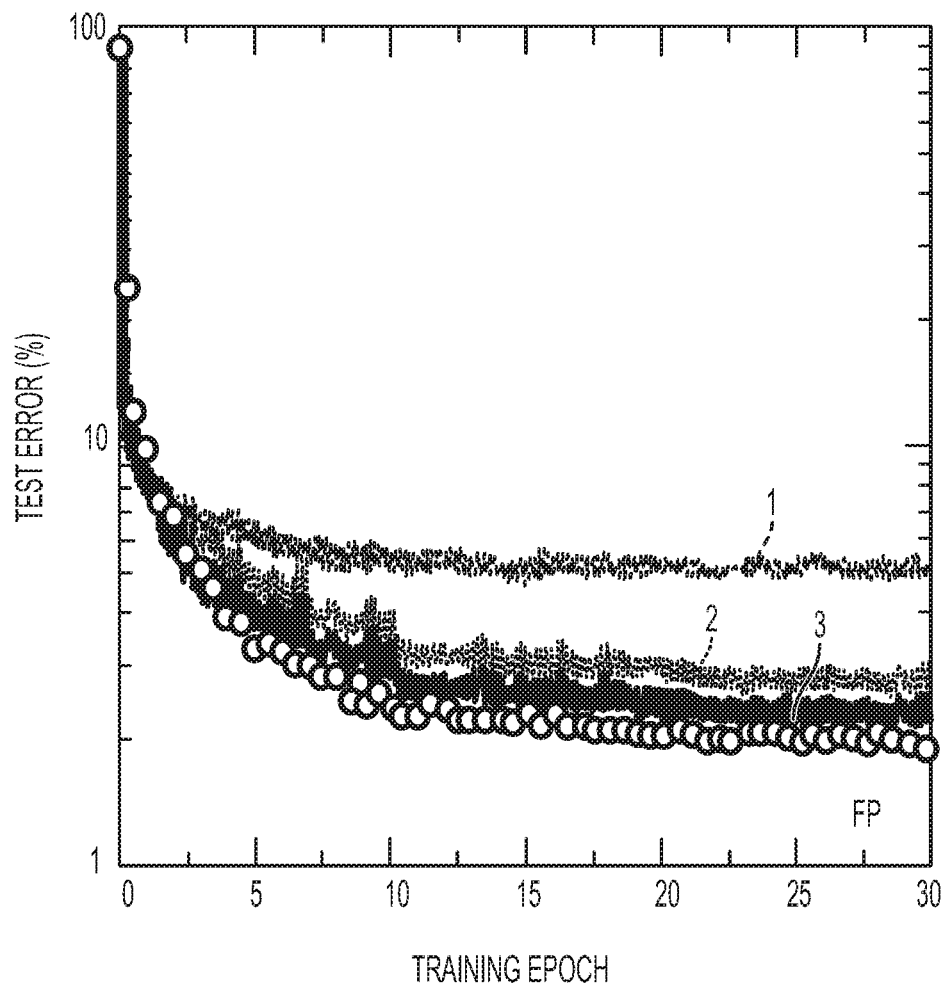
FIG. 4B illustrates training results when effects are more than one parameter are combined according to one or more embodiments.

FIG. 4A is a radar diagram that summarizes specifications of RPU devices that are derived from the "stress tests" performed in FIG. 3. Axes C-I correspond to experiments in FIGS. 3C-3I, respectively. Solid line 1 connects threshold values determined for these parameters for an acceptable 0.3% error penalty. Note that these specifications differ significantly from parameters typical for NVM (non-volatile memory) technologies. The storage in NVM devices is digital and typically does not exceed a few bits, and this constraint is imposed by the system requirement to achieve high signal-to-noise ratio for read and write operations. In addition, the write operation does not depend on history as it overwrites all previously stored values. In contrast, weight values in the neural network operation are not needed to be written and resolved with very a high signal-to-noise ratio. In fact, the algorithm can withstand up to 150% of noise in the weights updates (parameter C) and can tolerate up to 10% reading noise on columns or rows (parameter I). However, as opposed to a few bit storage capacity on NVM devices, a large number of coincidence events (over 600 from FIG. 3B) is required for the RPU device to keep track of the history of weight updates. In addition, in contrast to high endurance of full swing writing between bit levels required for NVM devices, RPU devices need to have high endurance only to small incremental changes ($\Delta g_{min}$). Combined contribution of all parameters considered in FIG. 4A can be additive and therefore exceed the acceptable 0.3% error penalty. FIG. 4B shows training results when effects of more than one parameter are combined. When all parameters (C, D, E, F, G, H, and I) are combined at the threshold, the test error reaches 5.0% which is 3.0% above the baseline model. Although this penalty can be acceptable for some applications, it is higher than the 0.3% error penalty considered above. This 3.0% penalty is higher than a simple additive impact of uncorrelated contributions indicating that at least some of these parameters are interacting. It opens the possibility of optimizing the error penalty by trading off tolerances between various parameters. For example, the model that combines only parameters C, D, and E at the threshold, as shown by curve 2 in FIG. 4B, gives 0.9% error penalty which is about the expected sum of individual contributions. Note that these parameters are defined by imperfections in device operation and by device-to-device mismatch which are all controlled by fabrication tolerances in a given technology. Even for deeply scaled CMOS technologies, the fabrication tolerances do not exceed 30% and that is much smaller than 150%, 110%, and 80% used for calculation of curve 2 in FIG. 4B. The contributions of C, D, and E to the error penalty can be eliminated by setting the corresponding tolerances to 30% (data not shown). In FIG. 4B, lines 1, 2, and 3 correspond to a stochastic model with a noise in vector-matrix multiplication of 100%, 60%, and 10%, respectively, normalized on activation function temperature which is unity. FIGS. 4A and 4B can be generally referred to as FIG. 4.

Among the parameters of FIG. 4A, the asymmetry between up and down changes in the conductance value of RPU devices (parameter F, G, and H) is the most restrictive and this asymmetry between up and down changes in the conductance value is solved by hysteresis as discussed herein, according to one or more embodiments. Parameter F (or G) is the global asymmetry that can be compensated for by controlling pulse voltages and/or number of pulses in the positive and negative update cycles, and hence even asymmetries higher than the threshold value of 5% can be eliminated with proper design of peripheral circuits. In contrast, the parameter H that is defined by device-to-device variation in the asymmetry can be compensated for by peripheral circuits only if each RPU device is addressed serially. To maintain the O(1) time complexity, the device mismatch parameter H and the noise parameter I can be co-optimized to reduce the error penalty. The resulting model illustrated by the shaded area bounded with curve 3 in FIG. 4B achieves at most 0.3% error penalty. For this model, parameters C, D, and E are set to 30% while F (or G) is set to zero, H is set to 2%, and I is set to 6%. Alternatively, the same result (data not shown) can be obtained by restricting the noise parameter I to 2.5% and increasing the device mismatch tolerance H to 4% and this can simplify the array fabrication in expense of designing less noisy circuits.

In addition to the parameters considered above, RPU devices can also show dependence on the conductance change on the stored conductance value $\Delta g_{min}(g_{ij})$. Such a behavior introduces an update rule that depends on the current weight value which can be written as $\Delta w_{min}(w_{ij})$. Experimenters performed simulations including a weight dependent update rule with different functional forms for $\Delta w_{min}(w_{ij})$ that included a linear or a quadratic dependence on weight value. In the first set of simulations, experimenters assume that the updates are balanced for any given weight value such that $\Delta w_{min}^{+}(w_{ij})=\Delta w_{min}^{-}(w_{ij})$ and therefore already satisfy the imbalance criteria H throughout the whole weight range. These simulation results show that the dependence of $\Delta g_{min}$ on $g_{ij}$ is not an important parameter as no additional error penalty above 0.3% is observed even when $\Delta w_{min}$ is varied by a factor of about 10. However, when experimenters introduce weight dependent updates that are not balanced, the experimenters observe additional error penalty as this condition violates imbalance criteria H.

Circuit and System Level Design Considerations

The ultimate acceleration of DNN training with the back-propagation algorithm on a RPU array of size N×N can be approached when O(1) time complexity operation is enforced. In this case, overall acceleration is proportional to $N^2$ and this favors very large arrays. In general the design of the array, peripheral circuits, and the whole system should be based on an optimization of the network parameters for a specific workload and classification task. In order to develop a general methodology for such a design, experimenters use the results of the analysis presented above as an example with understanding. However, that the developed approach is valid for a larger class of more complicated cases than a relatively simple 3 layer network used to classify the MNIST dataset in FIGS. 2-4.

RPU Array Design

For realistic technological implementations of the crossbar array (i.e., the array of RPU devices), the array size is limited by resistance and parasitic capacitance of the transmission lines resulting in significant RC (resistance capacitor) delay and voltage drop. For further analysis, experimenters assume that RPU devices are integrated at the back-end-of-line (BEOL) stack in between intermediate metal levels. This allows the top thick metal levels to be used for power distribution, and the lower metal levels and the area under the RPU array for peripheral CMOS circuitry. Typical intermediate metal levels in a scaled CMOS technology have a thickness of 360 nm (nanometers), and a width of 200 nm. Corresponding typical line resistance is about $r_{line}=0.36\Omega/\mu m$ (ohm/micrometer) with parasitic capacitance of $c_{line}=0.2$ fF/$\mu m$ (femtoFarads/micrometer). Assuming a reasonable 1 GHz (gigahertz) clock frequency for the pulses used during the update cycle, and allowing RC delay to be at most 10% of the pulse width (0.1 ns), the longest line length should be $l_{line}=1.64$ mm (millimeters). Assuming a reasonable line spacing of 200 nm this results in an array with 4096×4096 RPU devices. Since the conductance values of RPU devices can only be positive, experimenters assume that a pair of identical RPU device arrays are used to encode positive ($g_{ij}^+$) weight values and negative ($g_{ij}^-$) weight values. The weight value ($w_{ij}$) is proportional to a difference of two conductance values stored in two corresponding devices ($g_{ij}^+-g_{ij}^-$) located in identical positions of a pair of RPU arrays. To minimize the area, these two arrays can be stacked on top of each other occupying 4 consecutive metal levels resulting in a total area of $A_{array}=2.68$ mm². For this array size, a full update cycle (both positive and negative) performed using 1 ns (nanosecond) pulses can be completed in 20 ns for BL=10.

In order to estimate an average RPU device resistance, $R_{device}$, experimenters assume at most 10% voltage drop on the transmission line that is defined by $N \times R_{line}/R_{device}$, where $R_{line}$ is the total line resistance equal to $r_{line} \times l_{line}$. The contribution of the output resistance of the line drivers to the total line resistance can be minimized by proper circuit design. For an array size of N=4096, the average RPU device resistance is therefore $R_{device}=24$ MΩ (megaohms). Using this resistance value, and assuming an operating voltage of 1 V for all three training cycles and on average about 20% activity for each device that is typical for the models of FIGS. 2-4, the power dissipation on a pair of RPU arrays can be estimated as $P_{array}=0.28$ W (watts).

Design of Peripheral Circuits

Figure 5A:
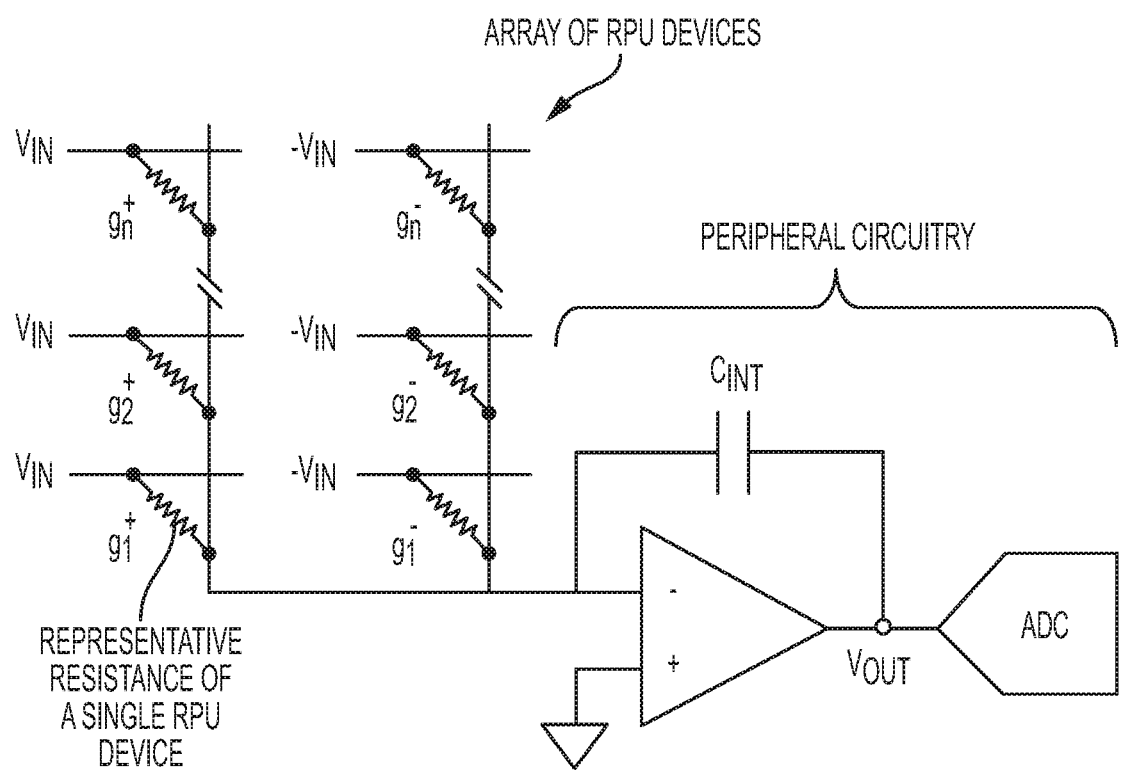
FIG. 5A is a schematic illustrating operation of a single column (or row) during forward (or backward) cycle according to one or more embodiments.

FIG. 5A depicts operation of a single column (or row) during forward (or backward) cycle showing an operational amplifier (op-amp) that integrates the differential current on the capacitor $C_{int}$, and an analog-to-digital converter (ADC). In contrast to the update cycle, stochastic translators are not needed. Here, experimenters assume that a time-encoding scheme is used when input vectors are represented by fixed amplitude $V_{in}=1$ V pulses with a tunable duration. Pulse duration is a multiple of 1 ns and is proportional to the value of the input vector. Currents generated at each RPU device are summed on the columns (or rows), and this total current is integrated over the measurement time $t_{meas}$ by current readout circuits as illustrated in FIG. 5A. Positive and negative voltage pulses are supplied separately to each of the identical RPU arrays that are used to encode positive and negative weights. Currents from both arrays are fed into peripheral circuitry that consists of the op-amp that integrates differential current on the capacitor $C_{int}$, and the ADC. Note, that for time-encoded pulses, the time-quantization error at the input to the RPU array scales inversely with the total number of pulses, and therefore, it is a better approach compared to the stochastic pulsing scheme. For the models in FIG. 4B number of pulses larger than 20 (approximately ~5 bit resolution) is enough to eliminate corresponding error penalty.

Experimenters define a single RPU tile as a pair of arrays with 4096×4096 devices with peripheral circuits that support the parallel operation of the array in all three cycles. Peripheral circuitry includes ADCs, op-amps, STRs consisting of random number generators, and line drivers used to direct signals along the columns and rows. As shown in FIG. 5C, the signals from an RPU tile are directed toward a non-linear function (NLF) circuit that calculates either activation functions (i.e., sigmoid, softmax) and their derivatives as well as arithmetical operations (i.e., multiplication) depending on cycle type (e.g., backward cycle, forward cycle, or update cycle) and on position of corresponding layer. At the tile boundary, input signals to the NLF are bounded to a certain threshold value to avoid signal saturation. Particularly, FIG. 5C is a schematic of the architecture for an accelerator RPU chip. RPU tiles are located on the bottom, NLF digital compute circuits are on the top, on-chip communication is provided by a bus or NoC (network on chip), and off-chip communication relies on I/O circuits.

Figure 5B:
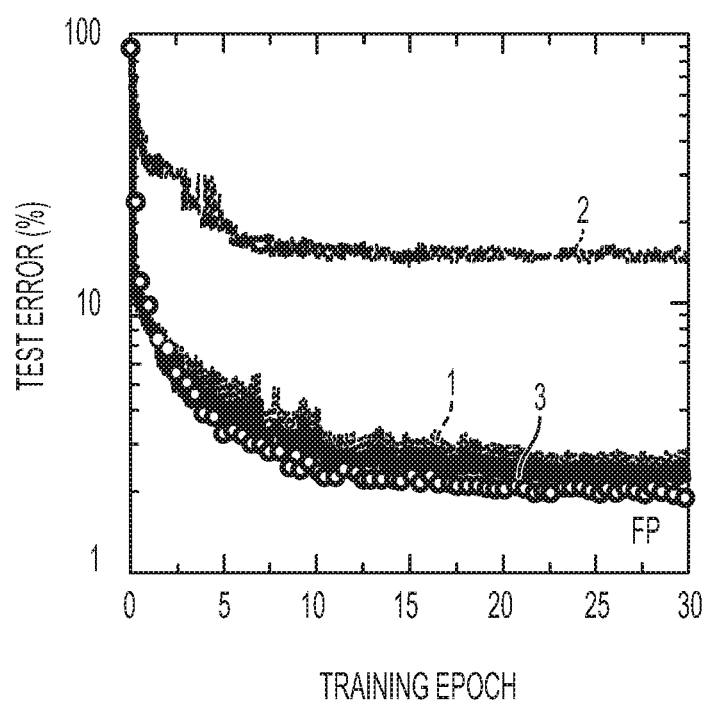
FIG. 5B is a graph of the test error for the network of model 3 in FIG. 4B according to one or more embodiments.

FIG. 5B shows test error for the network of the model 3 in FIG. 4B, but with bounds |α| imposed on results of vector-matrix multiplication that is equivalent to restricting the NLF input. Curve 1 corresponds to a model with |α|=3 imposed only on sigmoid activation function in hidden layers in FIG. 5B. Curves 2 and 3 corresponds to a model with |α|=3 and 12, respectively, imposed on both sigmoid and softmax activation functions in FIG. 5B. For neurons in hidden layers, the NLF circuit should compute a sigmoid activation function. When the input to this sigmoid NLF is restricted to |α|=3, the resulting error penalty does not exceed an additional 0.4% as shown by curve 1 in FIG. 5B.

Neurons at the output layer perform a softmax NLF operation that, when corresponding input is also restricted to |α|=3, results in exceedingly large error as shown by curve 2 in FIG. 5B. To make design more flexible and programmable, it is desired for the NLF in both hidden and output layers to have the same bounds. When bounds on both softmax and sigmoid NLF are restricted to |α|=12, the total penalty is within acceptable range as shown by curve 3 in FIG. 5B. Assuming 6% acceptable noise level taken from the results of FIG. 4B and an operation voltage range between −1 V and 1 V at the input to the ADC, the corresponding bit resolution and voltage step required are 9 bits and 3.9 mV, respectively. These numbers show that the acceptable total integrated RMS (root mean square) voltage noise at the input to the ADC (or at the output of the op-amp) should not exceed 5.0 mV.

Noise Analysis

Figure 5D:
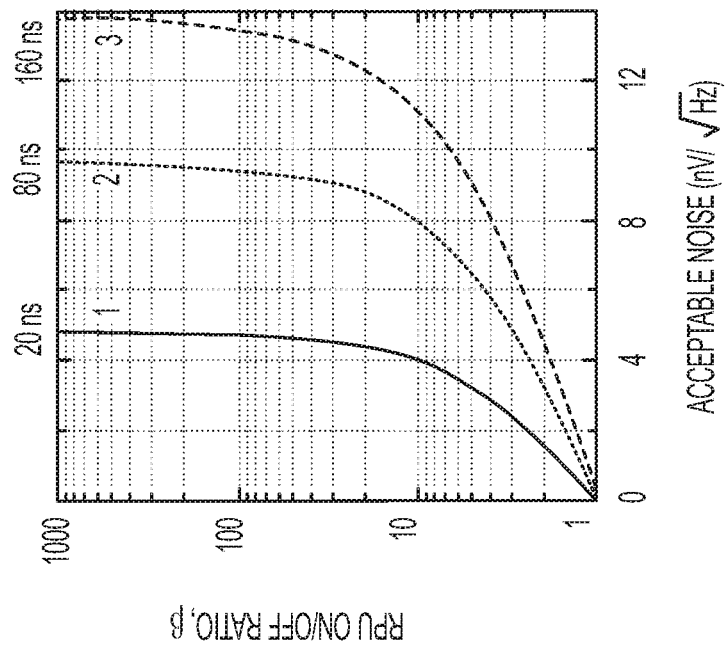
FIG. 5D is a graph of acceptable noise levels for various on/off ratio on the RPU devices according to one or more embodiments.
Figure 5C:
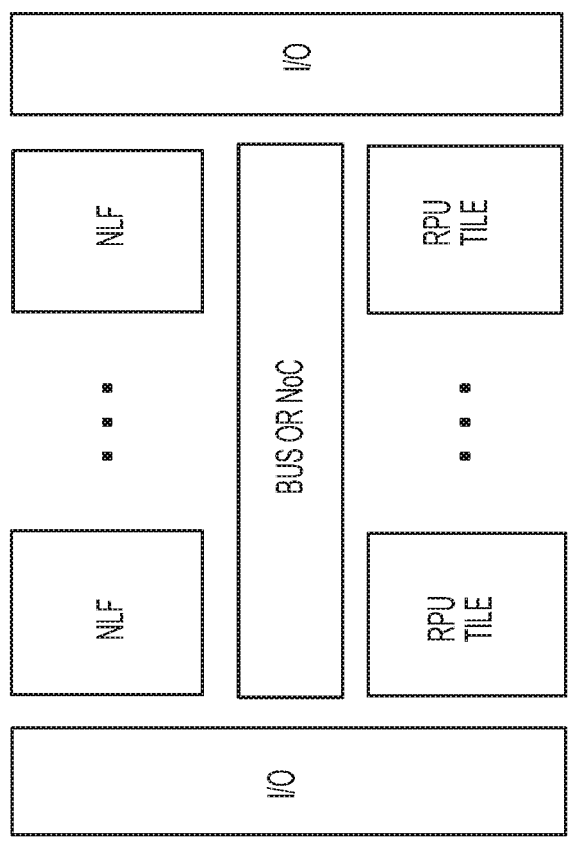
FIG. 5C is a schematic of the architecture for an accelerator RPU chip according to one or more embodiments.

In order to estimate the acceptable level of the input referred noise the integration function of the op-amp should be defined. Voltage at the output of the op-amp can be derived as $$V_{out} = 2N \frac{V_{in} I_{meas}}{R_{device} \, c_{int}} \left( \frac{\beta-1}{\beta+1} \right) \qquad \text{Eq. (4)}$$

where β is the conductance on/off ratio for an RPU device. This equation assumes all N RPU devices are contributing simultaneously which can make it more challenging to design a circuit that would require either a very large capacitor or large voltage swing. However, for a given bounds imposed on the NLF transformation and $|w_{ij}|$ for the weight values, the output voltage should not necessarily exceed the level corresponding to simultaneous contribution of $|\alpha|/\|w_{ij}\|$ devices. Since an acceptable bound $|\alpha|=12$ and $|w_{ij}|=0.6$ is enough as shown above, the number N in Equation (4) can be replaced with 20. Assuming that $V_{out}$ signal feeding into the ADC should not exceed 1 V, and the $R_{device}$ is 24 MΩ, the choice of integrating capacitor $C_{int}$ is dictated by the integration time $t_{meas}$ and on/off ratio β. FIG. 5D illustrates acceptable input referred noise levels for various on/off ratios β on the RPU devices and integration times $t_{meas}$. Curves 1, 2, and 3 correspond to $t_{meas}$ of 20 ns, 80 ns, and 160 ns, respectively. This $t_{meas}$ of noise level corresponds to the input referred noise of the op-amp calculated using standard noise analysis in integrator-based circuits (Jensen et al., 2013). If $t_{meas}$ is taken as 20 ns, following the quantization error consideration discussed above, the acceptable noise levels are relatively low such as of the order of just 5 (nV/$\sqrt{Hz}$) as seen in curve 1 of FIG. 5D. Even an increase of the on/off ratio β to several orders of magnitude does not help to accommodate higher noise. In order to accommodate higher noise $t_{meas}$ needs to be increased with a penalty, however, of increased overall calculation time. As seen from curves in FIG. 5D, for a given noise level, the on/off ratios as small as 2-10 can be acceptable; that is, in fact, quite modest in comparison to several orders of magnitude higher typical for NVM applications. When $t_{meas}$ and β are chosen as 80 ns and 8, respectively, the corresponding level of acceptable input referred noise shown by curve 2 in FIG. 5D can be derived as 7.6 (nV/$\sqrt{Hz}$). Experimenters note that this budget is calculated using the requirements for the backward pass, while for the forward pass the acceptable noise level is about six times larger with a value of about 45 (nV/$\sqrt{Hz}$), as discussed above. Corresponding capacitance $C_{int}$ can also be calculated as 103 fF using Equation (4).

Various noise sources can contribute to total acceptable input referred noise level of an op-amp including thermal noise, shot noise, and supply voltage noise, etc. Thermal noise due to a pair of arrays with 4096×4096 RPU devices can be estimated as 7.0 (nV/$\sqrt{Hz}$). Depending on the exact physical implementation of an RPU device and type of non-linear I-V response, shot noise levels produced by the RPU array can vary. Assuming a diode-like model, total shot noise from a whole array scales as a square root of a number of active RPU devices in a column (or a row), and hence depends on an overall instantaneous activity of the array. The average activity of the network that is typical for the models of FIGS. 2-4 is less than 1% for the backward cycle, while for the forward cycle it is much higher (approaching 20%). Correspondingly, these activities result in shot noise values of 3.1 nV/$\sqrt{Hz}$ and 13.7 nV/$\sqrt{Hz}$, for backward and forward cycles respectively. Therefore, the noise in the backward cycle is dominated by the thermal noise with a value of 7.0 nV/$\sqrt{Hz}$ and together with the shot noise contribution fits the total noise budget of 7.6 nV/$\sqrt{Hz}$. In contrast, the noise in the forward cycle is dominated by the shot noise with value of 13.7 nV/$\sqrt{Hz}$ and it also fits the corresponding total noise budget of 45 nV/$\sqrt{Hz}$. Experimenters note that longer integration time or smaller array size is needed for higher workloads or additional noise contributions including the noise on the voltage, amplifier noise, etc.

System Level Design Considerations

The tile area occupied by peripheral circuitry and corresponding dissipated power are dominated by the contribution from 4096 ADC. Assuming $t_{meas}$ of 80 ns for forward and backward cycles, ADCs operating with 9 bit resolution at 12.5 MSamples/sec are required. The state-of-the-art SAR-ADC that can provide this performance occupies an area of 0.0256 mm$^2$ and consumes 0.24 mW power, such that using the state-of-the-art SAR-ADC results in a total area of 104 mm$^2$ and a total power of 1 W for an array of 4096 ADCs. This area is much larger than the RPU array itself, and therefore it is reasonable to time-multiplex the ADCs between different columns (or rows) by increasing the sampling rate while keeping total power unchanged. Assuming each ADC is shared by 64 columns (or rows), the total ADC area can be reduced to 1.64 mm$^2$ with each ADC running at about 800 MSamples/sec. Since experimenters assume that RPU device arrays are built on the intermediate metal levels which is on top of peripheral CMOS circuitry, the total tile area is defined by the RPU array area of 2.68 mm$^2$ which leaves about 1.0 mm$^2$ for other circuitry (which also can be area optimized). For example, the number of random number generators used to translate binary data to stochastic bit streams can be significantly reduced to just 2 because no operations are performed on streams generated within columns (or rows) and evidenced by no additional error penalty for corresponding classification test (data not shown). The total area of a single tile therefore is 2.68 mm$^2$, while the total power dissipated by both RPU arrays and all peripheral circuitry (i.e., ADCs, op-amps, STR) can be estimated as 2.0 W, assuming 0.7 W reserved for op-amps and STRs. The number of weight updates per second on a single tile (RPU tile) can be estimated as 839 Tera Updates/s given the 20 ns duration of the update cycle and 4096×4096 RPU array size. This translates into power efficiency of 419 TeraUpdates/s/W and area efficiency of 319 TeraUpdates/s/mm$^2$. The tile throughput during the forward and backward cycles can be estimated as 419 TeraOps/s given 80 ns for forward (or backward) cycle with power and area efficiencies of 210 TeraOps/s/W and 156 TeraOps/s/mm$^2$, respectively. These efficiency numbers are about 5 orders of magnitude (10$^5$) better than state-of-the-art CPU and GPU performance metrics. The power and area efficiencies achieved for a single RPU tile can degrade as multiple tiles are integrated together as a system-on-chip. As illustrated in FIG. 5C, additional power and area should be reserved for programmable NLF circuits, on-chip communication via coherent bus or network-on-chip (NoC), off-chip I/O circuitry, etc. Increasing the number of RPU tiles on a chip could first result in an acceleration of a total chip throughput, but eventually would saturate as RPU tile will be limited by power, area, communication bandwidth and/or compute resources. State-of-the-art high-performance CPU or GPU can be taken as a reference for estimation of the maximum area of 600 mm$^2$ and power of 250 W on a single chip. While power and area per tile are not prohibitive to scale the number of tiles up to 50 to 100, the communication bandwidth and compute resources needed for a system to be efficient might be challenging. Communication bandwidth for a single RPU tile can be estimated assuming 5 bit input and 9 bit output per column (or row) for forward (or backward) cycles that give in total about 90 GB/s unidirectional bandwidths, and these 90 GB/s unidirectional bandwidths that also satisfy the update cycle communication requirements. This number is about 3 times less than the communication bandwidth in the state-of-the-art CPU between a single core and a nearby L2 cache. State-of-the-art on-chip coherent bus ((over three TB/s) or NoC (2.5

TB/s)) can provide sufficient communication bandwidth between distant tiles (i.e., RPU tiles). Compute resources needed to sustain O(1) time complexity for a single RPU tile can be estimated as 51 GigaOps/s assuming 80 ns cycle time and 4096 numbers generated at columns or rows. To support parallel operation of n RPU tiles, compute resources need to be scaled by O(n) thus limiting the number of RPU tiles that can be active at a given time to keep the total power envelop on a chip below 250 W. For example, a single core of a state-the-art CPU can achieve about 50 GigaFLOP/s and that might be sufficient to support one RPU tile. However, the maximum power is reached just for 12 RPU tiles assuming 20 W per core. Corresponding power efficiency for this design point would be 20 TeraOps/s/W as shown in Design 1 in Table 1 in FIG. 6. In FIG. 6, Table 1 is a summary of comparison of various RPU system designs versus state-of-the-art CPU and GPU. The same compute resources can be provided by 32 cores of state-of-the-art GPU, but with better power efficiency thus allowing up to 50 tiles to work in parallel. Corresponding power efficiency for this design would be 84 TeraOps/s/W as shown in Design 2 in Table 1. Further increase in the number of RPU tiles that can operate concurrently can be envisioned by designing specialized power and area efficient digital circuits that operate fixed point numbers with limited bit resolution. An alternative design can be based on just a few compute cores that can process the tile data sequentially in order to fit larger numbers of tiles to deal with larger network sizes as shown in Design 3 in Table 1. For example, a chip with 100 RPU tiles and a single 50 GigaOps/s compute core is capable of dealing with networks with as many as 1.6 billion weights and dissipate only about 22 W assuming 20 W from compute core and communication bus and dissipate just 2 W for RPU tiles since only one is active at any given time. This gives a power efficiency of 20 TeraOps/s/W which is four orders of magnitude ($10^4$) better than state-of-the-art CPU and GPU.

As can be appreciated, one or more embodiments provide configurations for RPU devices that can simultaneously store and process data locally and in parallel, thus providing significant acceleration for DNN training. The tolerance of the training algorithm to various RPU device and system parameters as well as to technological imperfections and different sources of noise has been discussed. This analysis has allowed experimenters to define a list of specifications for RPU devices summarized in Table 2 in FIG. 7. In FIG. 7, Table 2 is a summary of RPU device specifications according to one or more embodiments. Current contenders for RPU devices based on existing NVM technologies might not necessarily satisfy all the criteria simultaneously. However, the results of Table 2 can be used as a guide for a systematic search for physical mechanisms, materials, and device designs to realize the RPU device concepts with suitable CMOS-compatible technology.

Experimenters have presented an analysis of various system designs based on the RPU array configuration that can provide many orders of magnitude ($10^3$, $10^4$, $10^5$, and/or $10^6$ times) acceleration of deep neural network training while significantly decreasing required power and computer hardware resources. The results are summarized in Table 1. This analysis shows that (depending on the network size) different design choices for the RPU accelerator chip can be made that trade power versus the acceleration factor.

According to embodiments, the described accelerator chip design of FIG. 5C is flexible and can accommodate different types of DNN architectures beyond fully connected layers with similar acceleration factors. For example, convolutional layers can be also mapped to an RPU array in an analogous way, and one skilled in the art understands convolution layers. In this case, instead of performing a vector-matrix multiplication for forward and backward cycles, an array needs to perform a matrix-matrix multiplication that can be achieved by feeding the columns of the input matrix serially into the columns of the RPU array. In addition, peripheral NLF circuits need to be reprogrammed to perform not only calculation of activation functions, but also max-pooling and sub-sampling. The required connectivity between layers can be achieved by reprogramming tile addresses in a network. The update cycle for a convolutional layer can require computation of the product of two matrixes that are used during the forward and backward cycles. This can be achieved by serially feeding the columns of the input matrix and the columns of the error matrix simultaneous to the RPU array. During the update cycle, each RPU device performs a series of local multiplication and summation operations, and hence each RPU device calculates the product of the two matrixes during the update. It is noted that all three cycles (e.g., forward, backward, and update cycles) on the RPU array are similar for both convolutional and fully connected layers and do not require reprograming. Indeed, a convolutional layer can be viewed as a fully connected layer with a mini-batch size larger than unity. The throughput of an RPU accelerator chip is independent of the DNN architecture and the mini-batch size, and therefore the RPU accelerator chip achieves similar acceleration factors for similar RPU array sizes. However, the RPU device and system specifications should be reconsidered for different DNN architectures and datasets using the approach described herein. Most of the recent DNN architectures are based on a combination of many convolutional and fully connected layers with a number of parameters of the order of a billion. The analysis demonstrates that a single RPU accelerator chip can be used to train such a large DNNs. Problems of the size of ImageNet classification that currently require days of training on multiple GPUs can take just less than a minute on a single RPU accelerator chip according to one or more embodiments.

Figure 10B:
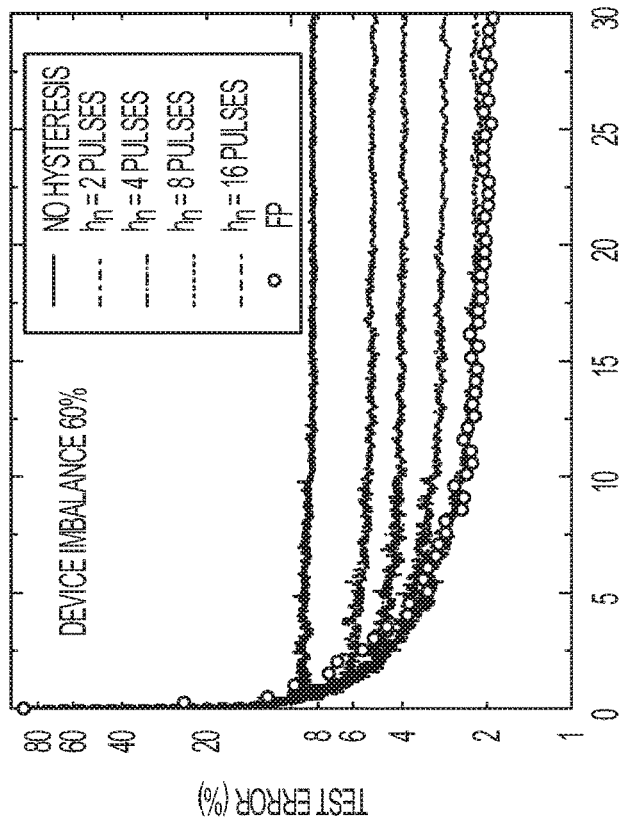
FIG. 10B is a graph of test error illustrating training results with different degrees of hysteresis according to one or more embodiments.
Figure 10A:
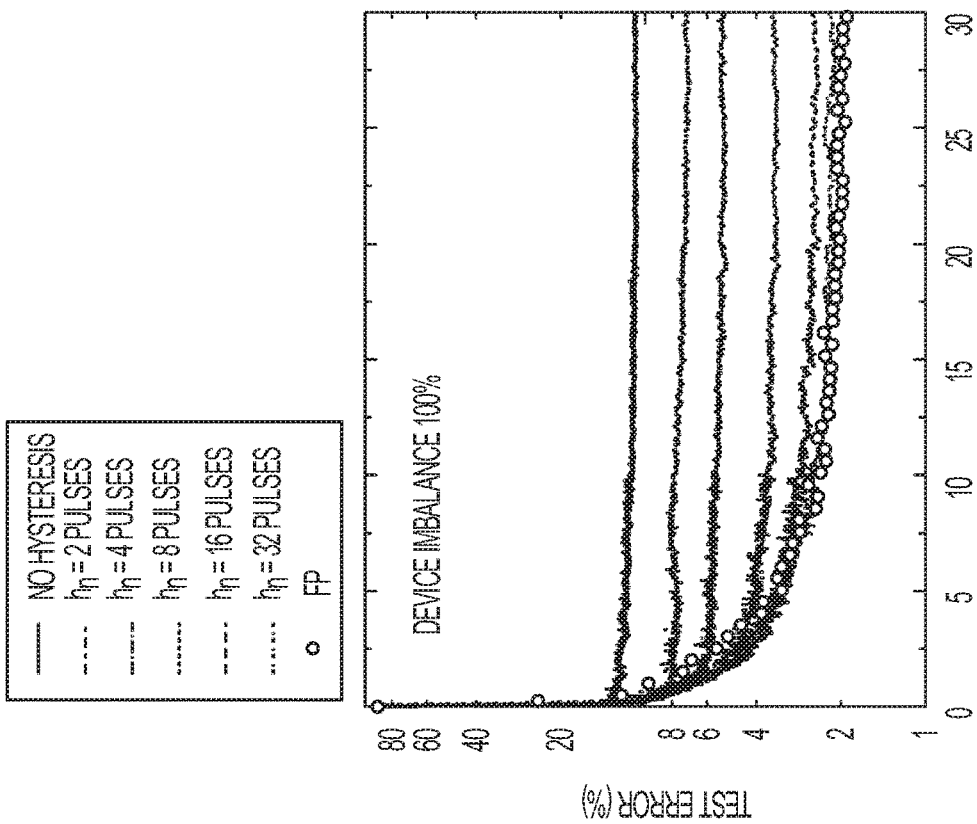
FIG. 10A is a graph of test error illustrating training results with different degrees of hysteresis according to one or more embodiments.

FIGS. 10A and 10B are graphs of training results with hysteresis (for the RPU devices) according to one or more embodiments. As noted above, 1 training epoch equals 60,000 training images. FIG. 10A illustrates the test error % versus the training epoch for RPU devices with 100% imbalance. An example of 100% imbalanced device is such that the conductance change in positive directions ($\Delta g^+_{min}$) is a factor of 2 stronger (i.e., 2 times) than the change in negative ($\Delta g^-_{min}$) direction, or vice versa. For comparison, FIG. 10A shows the comparison curves for no hysteresis versus hysteresis $h_n$ of 2, 4, 8, 16, and 32 pulses. FIG. 10A also illustrates a curve (as circles) for the floating point (FP) number baseline which represents the highest accuracy and lowest test error (e.g., a 2% test error means the RPU device reaches the correct result 98% of the time). The hysteretic RPU devices can achieve approximately a 2% test error by using hysteresis $h_n$=32 pulses even with device imbalance 100%, according to one or more embodiments. It should be noted that the hysteresis of an RPU device remains the same (e.g., remains at $h_n$=32 pulses), and the examples in FIGS. 10A and 10B represent RPU devices having different hysteresis. Hysteresis is a function of the physical structure of the RPU device, and any of the RPU devices discussed can be hysteretic RPU devices according to embodiments. Hysteric devices are can be regularly fabricated because devices free of hysteresis can be harder to achieve. Mechanisms such as charge diffusion or domain wall motion for magnetic devices are usually hysteretic. Also, most memristive devices are (in general) hysteretic.

Similarly, FIG. 10B illustrates the test error % versus the training epoch for RPU devices with 60% imbalance. For comparison, FIG. 10A shows the comparison curves for no hysteresis versus hysteresis $h_n$ of 2, 4, 8, 16 pulses. FIG. 10A also illustrates a curve (as circles) for the floating point (FP) number baseline which represents the highest accuracy and lowest test error (e.g., a 2% test error means the RPU device reaches the correct result 98% of the time). The hysteretic RPU devices can achieve approximately a 2% test error by using hysteresis $h_n$=16 pulses even with device imbalance 60%. With a lower imbalance for the RPU device, FIG. 10B can reach (approximately) the 2% test error with a lower hysteresis $h_n$ than FIG. 10A.

Figure 11:
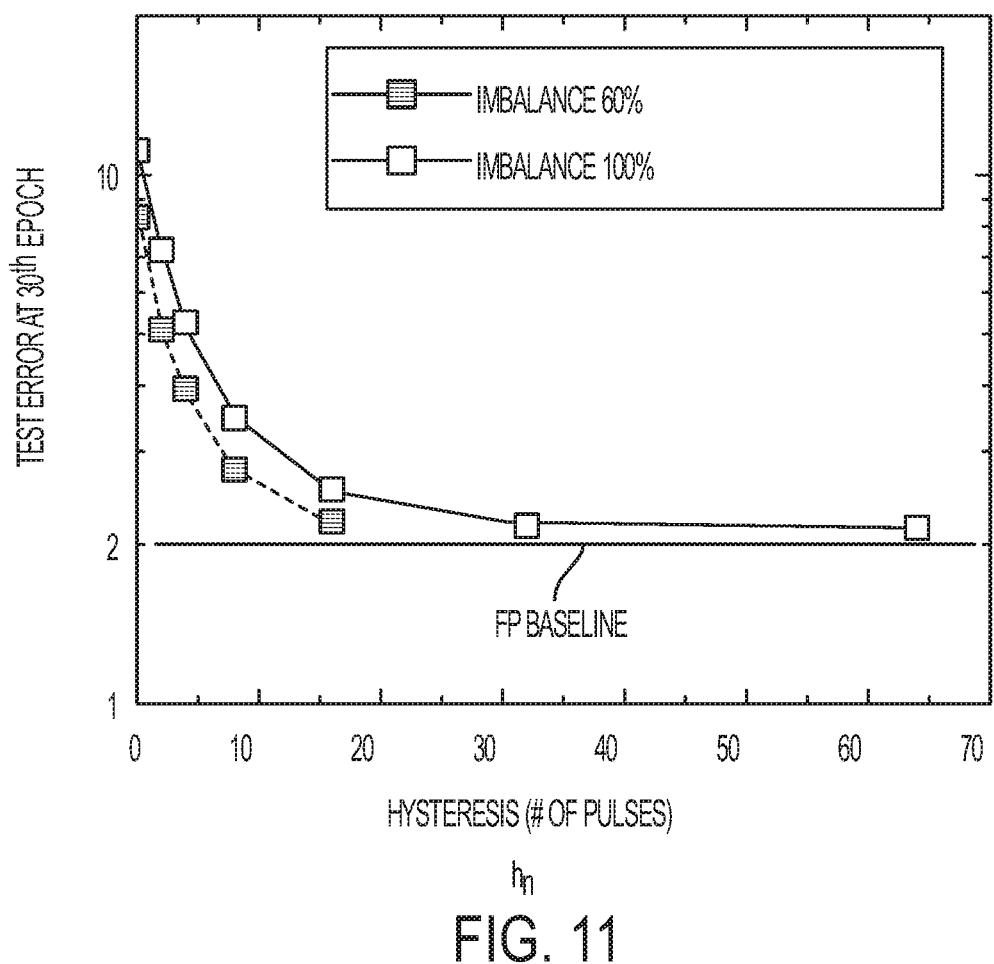
FIG. 11 is a graph of test error illustrating the number of pulses of hysteresis according to one or more embodiments.

FIG. 11 is a graph illustrating the test error rate at the 30$^{th}$ epoch versus RPU device with hysteresis for both 60% imbalance and 100% imbalance according to one or more embodiments.

Figure 12:
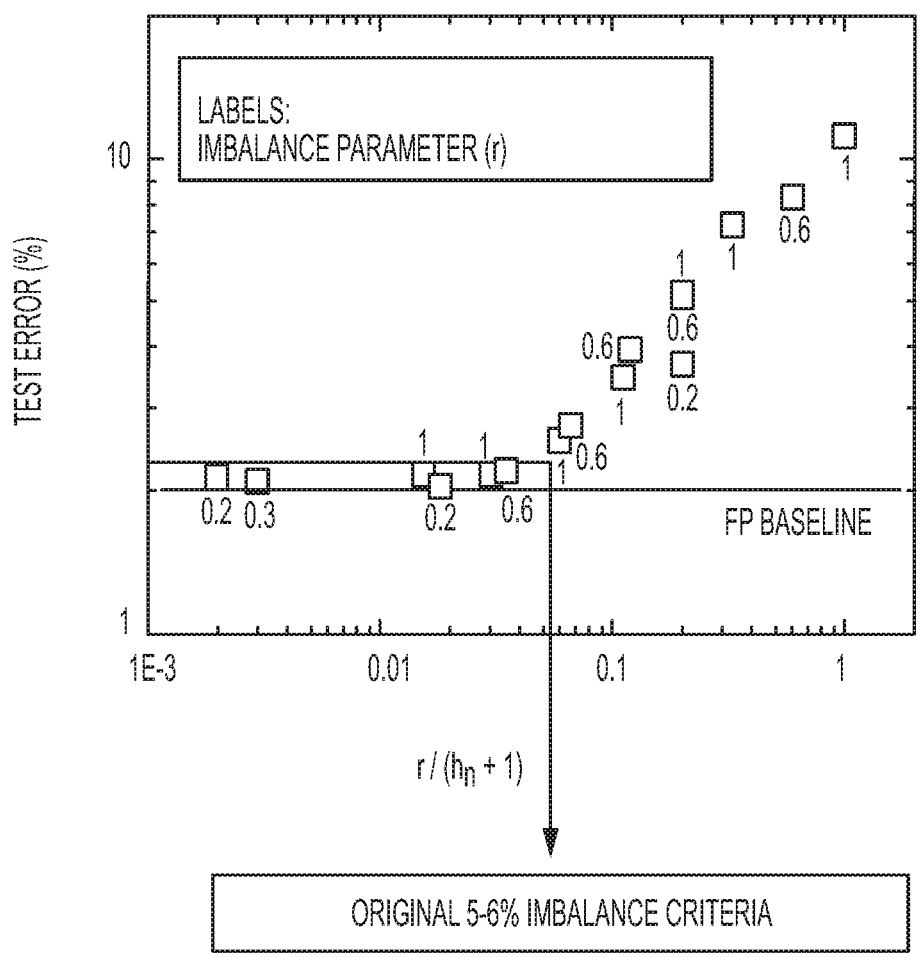
FIG. 12 is a graph illustrating that hysteresis renormalizes the imbalance factor according to one or more embodiments.

FIG. 12 is a graph illustrating that hysteresis renormalizes (i.e., fixes) the imbalance factor according to one or more embodiments. The imbalance factor is r, and $$\frac{\Delta w_{min}^+}{\Delta w_{min}^-} = 1 \pm r$$

which is the same as $$\frac{\Delta g_{min}^+}{\Delta g_{min}^-} = 1 \pm r.$$

When imbalance factor r is introduced alone without a hysteresis term (i.e., $h_n$=0) then the acceptable threshold value of about 5% is derived using a test error rate of about 2.3%. However, when a nonzero hysteresis term is introduced as shown in FIG. 12, this hysteresis term renormalizes the imbalance factor. When neural network training is performed with varying imbalance and hysteresis terms, it is shown that the renormalized imbalance term $r/(h_n+1)$ can be used to predict the performance of the network training. The labels for each data point in FIG. 12 shows the imbalance value (r) used is for the corresponding data point and it is clear that the renormalized asymmetry $r/(h_n+1)$ is the relevant parameter that controls the training results.

Figure 13:
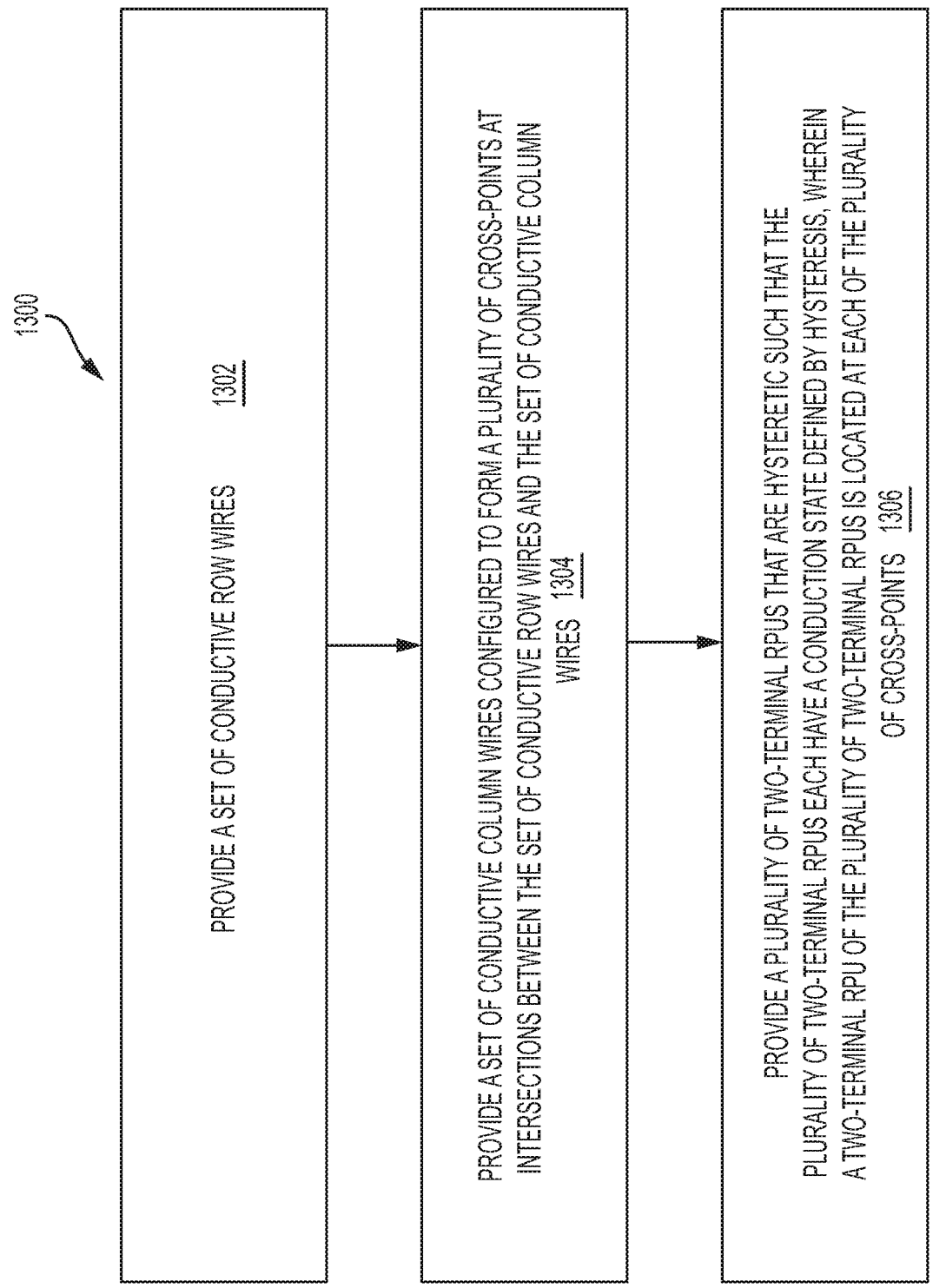
FIG. 13 is a flow chart of a method of forming a resistive processing unit array according to one or more devices.

FIG. 13 is a flow chart 1300 of a method of forming a resistive processing unit (RPU) array (such as the RPU array 1500 in FIG. 15) according to one or more embodiments. The RPU array 1500 is provided for explanation purposes. Reference can be made to FIGS. 1-12, 14, 15, and 16.

At block 1302, a set of conductive row wires 1502A-N is provided. At block 1304, a set of conductive column wires 1504A-N configured to form a plurality of cross-points at intersections between the set of conductive row wires 1502A-N and the set of conductive column wires 1504A-N. At block 1306, a plurality of two-terminal RPUs 1550 that are hysteretic such that the plurality of two-terminal RPUs 1550 each have a conductance state defined by hysteresis, where a two-terminal RPU 1550 of the plurality of two-terminal RPUs 1550 is located at each of the plurality of cross-points.

The hysteresis of the plurality of two-terminal RPUs 1550 is configured to cause a change in the conductance state to have a delay for a predefined amount of pulses. The predefined amount of pulses (i.e., hysteresis $h_n$) is a number of update cycle pulses. The update pulses (of the backpropagation algorithm) are configured to be applied (concurrently or nearly concurrently) to both the set of conductive row wires 1502A-N and the set of conductive column wires 1504A-N. The change in the conductance state is defined as a switch in the conductance state from a first direction to a second direction or a switch in the conductance state from the second direction to the first direction.

The delay (i.e., hysteresis) is equal for the switch in the conductance state from the first direction to the second direction and for the switch in the conductance state from the second direction to the first direction. The update pulses switch between a positive pulse and a negative pulse. The positive pulse causes the first direction of the conductance state and the negative pulse causes the second direction of the conductance state.

The plurality of two-terminal RPUs 1550 are imbalanced devices having an imbalance in the conductance state between slopes of the first direction and the second direction. The hysteresis in the plurality of two-terminal RPUs 1550 decreases the imbalance.

Figure 14:
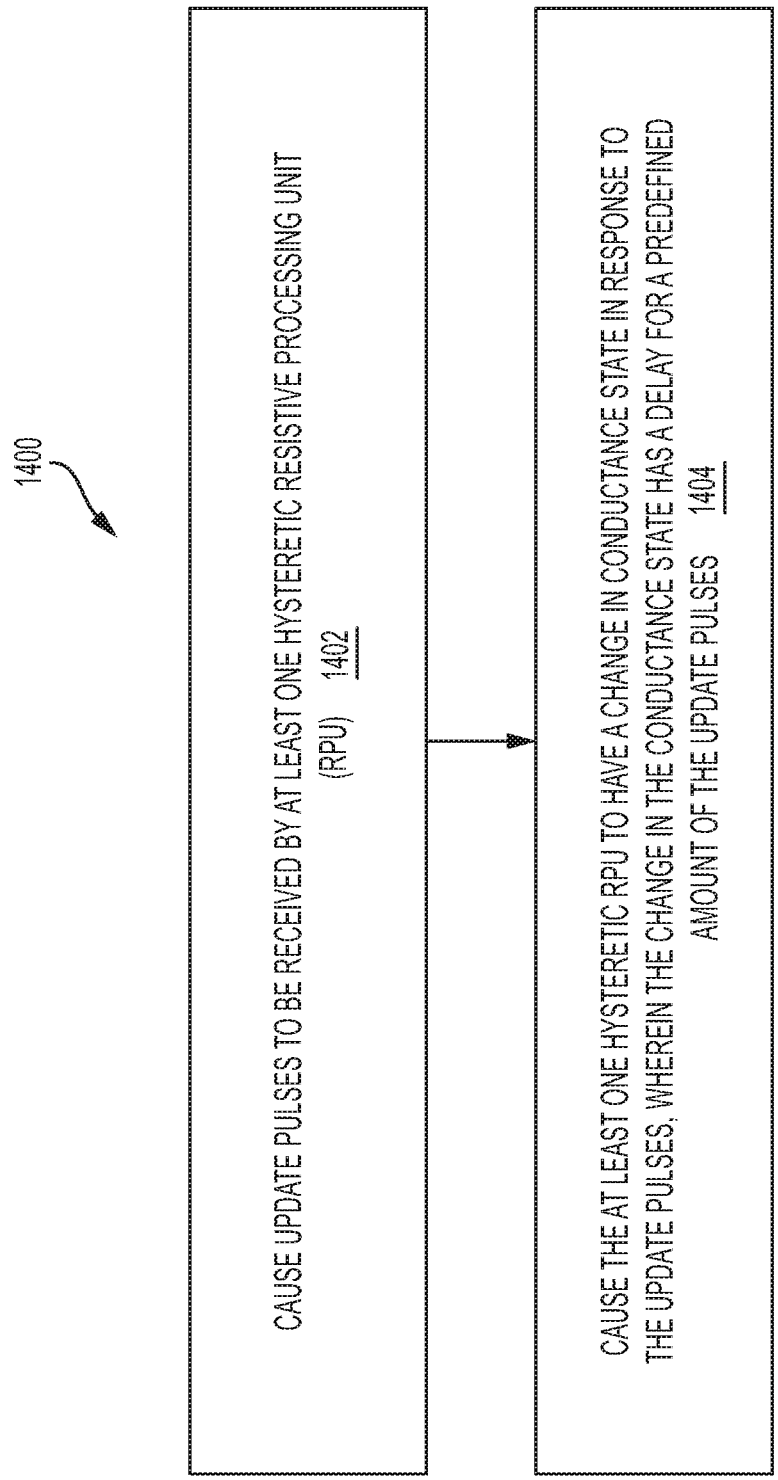
FIG. 14 is a flow chart of a method for hysteresis operation according to one or more embodiments.
Figure 15:
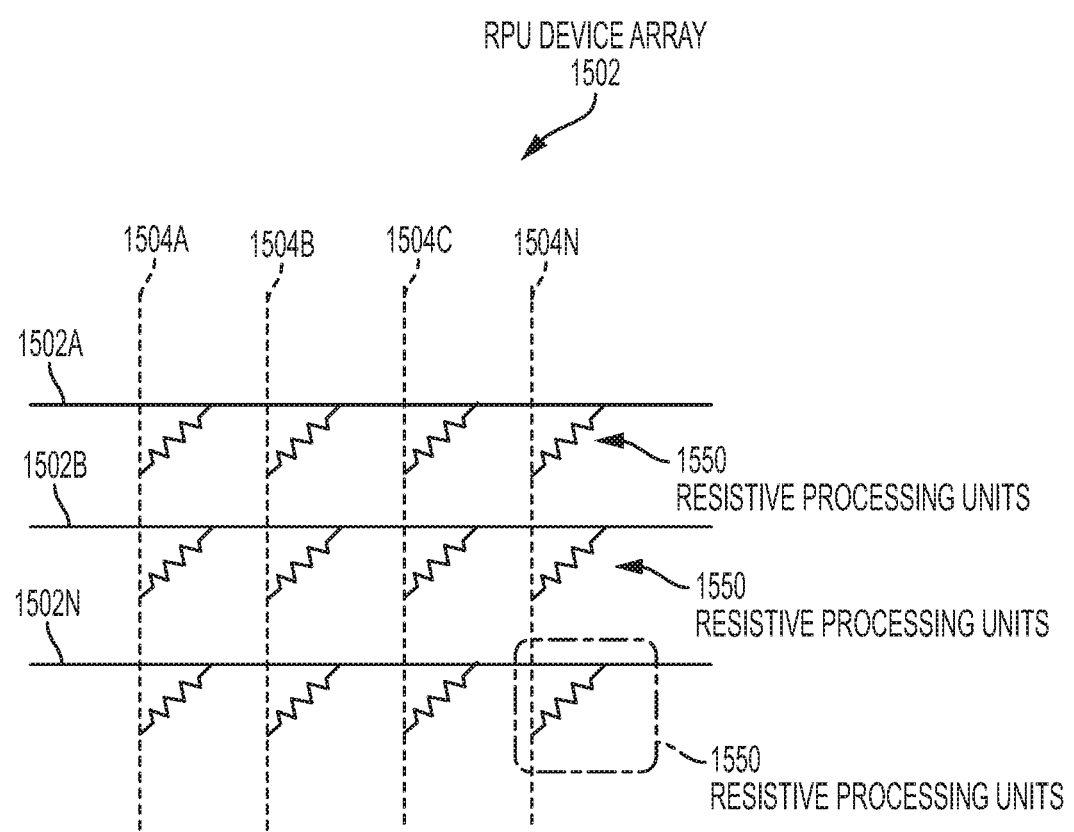
FIG. 15 is an example RPU array according to one or more embodiments.

FIG. 14 is a flow chart 1400 of a method for hysteresis operation according to one or more embodiments. Reference can be made to FIGS. 1-13, 15, and 16. At block 1402, update pulses (from one or more voltages sources) are received by at least one hysteretic resistive processing unit (RPU) 1550. At block 1404, the at least one hysteretic RPU 1550 to have a change in conductance state in response to the update pulses, where the change in the conductance state has a delay for a predefined amount of the update pulses (i.e., hysteresis $h_n$).

Technical benefits include resistive processing units/devices with hysteretic updates for neural network training. The hysteretic resistive processing units/devices increase the tolerance by introducing hysteresis updates in resistive processing units to correct the imbalance caused by asymmetry in the resistive processing unit thereby correcting the imbalance (unequalness) in the up and down changes in conductance value of the resistive processing unit.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A resistive processing unit (RPU) array comprising:
a set of conductive row wires;
a set of conductive column wires configured to form a plurality of cross-points at intersections between the set of conductive row wires and the set of conductive column wires; and
a plurality of two-terminal RPUs that are hysteretic such that the plurality of two-terminal RPUs each have a conductance state defined by hysteresis, wherein a two-terminal RPU of the plurality of two-terminal RPUs is located at each of the plurality of cross-points, one terminal of the two-terminal RPU being coupled to a stochastic translator and another terminal of the two-terminal RPU being coupled to another stochastic translator.

2. The RPU array of claim 1, wherein the hysteresis of the plurality of two-terminal RPUs is configured to cause a change in the conductance state to have a delay for a predefined amount of pulses.

3. The RPU array of claim 2, wherein the predefined amount of pulses is a number of update pulses.

4. The RPU array of claim 3, wherein the update pulses are configured to be applied to both the set of conductive row wires and the set of conductive column wires.

5. The RPU array of claim 2, wherein the change in the conductance state is defined as a switch in the conductance state from a first direction to a second direction or a switch in the conductance state from the second direction to the first direction.

6. The RPU array of claim 5, wherein the delay is equal for the switch in the conductance state from the first direction to the second direction and for the switch in the conductance state from the second direction to the first direction.

7. The RPU array of claim 3, wherein the update pulses switch between a positive pulse and a negative pulse.

8. The RPU array of claim 7, wherein the positive pulse causes the first direction of the conductance state and the negative pulse causes the second direction of the conductance state.

9. The RPU array of claim 1, wherein:
the plurality of two-terminal RPUs are imbalanced devices having an imbalance in the conductance state between slopes of a first direction and a second direction; and
the hysteresis in the plurality of two-terminal RPUs decreases the imbalance.

10. A method of forming a resistive processing unit (RPU) array, the method comprising:
providing a set of conductive row wires;
providing a set of conductive column wires configured to form a plurality of cross-points at intersections between the set of conductive row wires and the set of conductive column wires; and
providing a plurality of two-terminal RPUs that are hysteretic such that the plurality of two-terminal RPUs each have a conductance state defined by hysteresis, wherein a two-terminal RPU of the plurality of two-terminal RPUs is located at each of the plurality of cross-points, one terminal of the two-terminal RPU being coupled to a stochastic translator and another terminal of the two-terminal RPU being coupled to another stochastic translator.

11. The method of claim 10, wherein the hysteresis of the plurality of two-terminal RPUs is configured to cause a change in the conductance state to have a delay for a predefined amount of pulses.

12. The method of claim 11, wherein the predefined amount of pulses is a number of update pulses.

13. The method of claim 12, wherein the update pulses are configured to be applied to both the set of conductive row wires and the set of conductive column wires.

14. The method of claim 11, wherein the change in the conductance state is defined as a switch in the conductance state from a first direction to a second direction or a switch in the conductance state from the second direction to the first direction.

15. The method of claim 14, wherein the delay is equal for the switch in the conductance state from the first direction to the second direction and for the switch in the conductance state from the second direction to the first direction.

16. The method of claim 12, wherein the update pulses switch between a positive pulse and a negative pulse.

17. The method of claim 16, wherein the positive pulse causes the first direction of the conductance state and the negative pulse causes the second direction of the conductance state.

18. The method of claim 10, wherein:
the plurality of two-terminal RPUs are imbalanced devices having an imbalance in the conductance state between slopes of a first direction and a second direction;
the hysteresis in the plurality of two-terminal RPUs decreases the imbalance.

19. A method for hysteresis operation, the method comprising:
causing update pulses to be received by at least one hysteretic resistive processing unit (RPU), one terminal of the at least one hysteretic RPU being coupled to a stochastic translator and another terminal of the at least one hysteretic RPU being coupled to another stochastic translator; and
causing the at least one hysteretic RPU to have a change in a conductance state in response to the update pulses, wherein the change in the conductance state has a delay for a predefined amount of the update pulses.

20. The method of claim 19, wherein the change in the conductance state is a switch in the conductance state from a first direction to a second direction or a switch in the conductance state from the second direction to the first direction.

* * * * *